United States Patent [19]

Cooper, Jr.

[11] Patent Number: 4,718,090
[45] Date of Patent: Jan. 5, 1988

[54] METHOD AND APPARATUS FOR HIGH-SPEED PROCESSING OF VIDEO IMAGES

[76] Inventor: James E. Cooper, Jr., 567 Charlotte Dr., San Marcos, Calif. 92069

[21] Appl. No.: 851,798

[22] Filed: Apr. 14, 1986

[51] Int. Cl.[4] .............................................. G06K 9/46
[52] U.S. Cl. ...................... 382/26; 358/260; 382/56
[58] Field of Search .................. 382/26, 56; 358/260, 358/261, 262, 263

[56] References Cited

U.S. PATENT DOCUMENTS

| | | | |
|---|---|---|---|
| 4,069,411 | 1/1978 | Morton | 382/26 |
| 4,107,648 | 8/1978 | Frank | 382/26 |
| 4,183,013 | 1/1980 | Agrawala et al. | 382/26 |
| 4,189,711 | 2/1980 | Frank | 382/26 |
| 4,624,013 | 11/1986 | Urushibata | 382/26 |

*Primary Examiner*—Leo H. Boudreau
*Attorney, Agent, or Firm*—Brown, Martin, Haller & Meador

[57] ABSTRACT

A method and apparatus for high-speed processing of video images of objects in a scene. Each pixel, in lines of bicolored pixels of a raster scanned video image containing at least one object, is identified as to the object of which the pixel corresponds. Adjacent bicolored pixels of the same color across a line are grouped into corresponding numbered pixel groups. Pixel groups of the same color are downwardly grouped into numbered blobs of pixel groups. When a next line pixel group occurs which is of the same color with more than one previous line pixel group, the next line pixel group is grouped as part of first occurring previous line blob. Additional pixel group matches occurring between pixel groups of a previous and next line are upwardly grouped to provide a common ancestor blob number to each blob of the pixel group in each additional pixel group match. Blobs having common ancestor blob numbers are grouped into numbered object with each blob belonging to an object so that each pixel, through a blob number, corresponds to an object number.

16 Claims, 47 Drawing Figures

VIDEO IMAGE

THRESHOLD VIDEO IMAGE DATA

```
                    PIXEL POSITION NUMBER
                    0   1   2   3   4   5   6   7
        LINE    0(A) 001 001 001 001 001 001 001 001
      NUMBER
     (MEMORY
      SECTION)
```

FIG. 3A PIXEL/SEGMENT MEMORY DATA

```
              MEMORY ADDRESS
                  001
        LINE    
      NUMBER  0 | 512
```

FIG. 3B SEGMENT/BLOB MEMORY DATA

```
                    PIXEL POSITION NUMBER
                    0   1   2   3   4   5   6   7
        LINE    0 | 512 512 512 512 512 512 512 512
      NUMBER
```

FIG. 3C BLOB DATA

```
                     MEMORY ADDRESS
                    0  1  2 ··· 512 513 514 ··· 1023
      BLOB DATA |              512
```

FIG. 3D BLOB ANCESTOR MEMORY DATA

FIG. 4A PIXEL/SEGMENT MEMORY DATA

|  | PIXEL POSITION NUMBER | | | | | | | |
|---|---|---|---|---|---|---|---|---|
| LINE NUMBER (MEMORY SECTION) | 0 | 1 | 2 | 3 | 4 | 5 | 6 | 7 |
| 0 (A) | 001 | 001 | 001 | 001 | 001 | 001 | 001 | 001 |
| 1 (B) | 001 | 001 | 010 | 010 | 011 | 100 | 100 | 101 |

FIG. 4B SEGMENT/BLOB MEMORY DATA

|  | MEMORY ADDRESS | | | | |
|---|---|---|---|---|---|
| LINE NUMBER | 001 | 010 | 011 | 100 | 101 |
| 0 | 512 | | | | |
| 1 | 512 | 0 | 512 | 1 | 512 |

FIG. 4C BLOB DATA

|  | PIXEL POSITION NUMBER | | | | | | | |
|---|---|---|---|---|---|---|---|---|
| LINE NUMBER | 0 | 1 | 2 | 3 | 4 | 5 | 6 | 7 |
| 0 | 512 | 512 | 512 | 512 | 512 | 512 | 512 | 512 |
| 1 | 512 | 512 | 0 | 0 | 512 | 1 | 1 | 512 |

FIG. 4D BLOB ANCESTOR MEMORY DATA

|  | MEMORY ADDRESS | | | | | | |
|---|---|---|---|---|---|---|---|
|  | 0 | 1 | 2 | ··· | 512 | 513 | 514 ··· 1023 |
| BLOB DATA | 0 | 1 | | | 512 | | |

FIG. 5A PIXEL/SEGMENT MEMORY DATA

|  | PIXEL POSITION NUMBER | | | | | | | |
|---|---|---|---|---|---|---|---|---|
| LINE NUMBER (MEMORY SECTION) | 0 | 1 | 2 | 3 | 4 | 5 | 6 | 7 |
| 0 (A) | 001 | 001 | 001 | 001 | 001 | 001 | 001 | 001 |
| 1 (B) | 001 | 001 | 010 | 010 | 011 | 100 | 100 | 101 |
| 2 (A) | 000 | 000 | 000 | 000 | 000 | 000 | 000 | 001 |

FIG. 5B SEGMENT/BLOB MEMORY DATA

|  | MEMORY ADDRESS | | | | | |
|---|---|---|---|---|---|---|
| LINE NUMBER | 000 | 001 | 010 | 011 | 100 | 101 |
| 1 | 512 | 0 | 512 | 1 | 512 | |
| 2 | 0 | 512 | | | | |

FIG. 5C BLOB DATA

|  | PIXEL POSITION NUMBER | | | | | | | |
|---|---|---|---|---|---|---|---|---|
| LINE NUMBER | 0 | 1 | 2 | 3 | 4 | 5 | 6 | 7 |
| 0 | 512 | 512 | 512 | 512 | 512 | 512 | 512 | 512 |
| 1 | 512 | 512 | 0 | 0 | 512 | 1 | 1 | 512 |
| 2 | 0 | 0 | 0 | 0 | 0 | 0* | 0* | 512 |

FIG. 5D BLOB ANCESTOR MEMORY DATA

|  | MEMORY ADDRESS | | | | | | |
|---|---|---|---|---|---|---|---|
|  | 0 | 1 | 2 | ... | 512 | 513 | 514 ... 1023 |
| BLOB DATA | 0 | 1 | | | 512 | | |

FIG. 5E FIFO DATA

|  | MEMORY ADDRESS | | | | |
|---|---|---|---|---|---|
|  | 0 | 1 | 2 | 3 | ....255 |
| BLOB LINK PAIR DATA | 1/0 | | | | |

FIG. 6A  PIXEL/SEGMENT MEMORY DATA

|  | PIXEL POSITION NUMBER | | | | | | | |
|---|---|---|---|---|---|---|---|---|
| LINE NUMBER (MEMORY SECTION) | 0 | 1 | 2 | 3 | 4 | 5 | 6 | 7 |
| 0(A) | 001 | 001 | 001 | 001 | 001 | 001 | 001 | 001 |
| 1(B) | 001 | 001 | 010 | 010 | 011 | 100 | 100 | 101 |
| 2(A) | 000 | 000 | 000 | 000 | 000 | 000 | 000 | 001 |
| 3(B) | 000 | 000 | 001 | 001 | 010 | 011 | 100 | 101 |

FIG. 6B  SEGMENT/BLOB MEMORY DATA

| LINE NUMBER | MEMORY ADDRESS | | | | | |
|---|---|---|---|---|---|---|
|  | 000 | 001 | 010 | 011 | 100 | 101 |
| 2 | 0 | 512 |  |  |  |  |
| 3 | 0 | 513 | 0 | 514 | 0 | 512 |

FIG. 6C  BLOB DATA

| LINE NUMBER | PIXEL POSITION NUMBER | | | | | | | |
|---|---|---|---|---|---|---|---|---|
|  | 0 | 1 | 2 | 3 | 4 | 5 | 6 | 7 |
| 0 | 512 | 512 | 512 | 512 | 512 | 512 | 512 | 512 |
| 1 | 512 | 512 | 0 | 0 | 512 | 1* | 1* | 512 |
| 2 | 0 | 0 | 0 | 0 | 0 | 0 | 0 | 512 |
| 3 | 0 | 0 | 513 | 513 | 0 | 514 | 0 | 512 |

FIG. 6D  BLOB ANCESTOR MEMORY DATA

| BLOB DATA | MEMORY ADDRESS | | | | | | |
|---|---|---|---|---|---|---|---|
|  | 0 | 1 | 2 | ... | 512 | 513 | 514 ... 1023 |
|  | 0 | 1 |  |  | 512 | 513 | 514 |

FIG. 6E  FIFO DATA

| BLOB LINK PAIR DATA | MEMORY ADDRESS |
|---|---|
|  | 0  1  2  3 . . . . . . . 255 |
|  | 1/0 |

FIG. 7A PIXEL/SEGMENT MEMORY DATA

PIXEL POSITION NUMBER

| LINE NUMBER (MEMORY SECTION) | 0 | 1 | 2 | 3 | 4 | 5 | 6 | 7 |
|---|---|---|---|---|---|---|---|---|
| 0 (A) | 001 | 001 | 001 | 001 | 001 | 001 | 001 | 001 |
| 1 (B) | 001 | 001 | 010 | 010 | 011 | 100 | 100 | 101 |
| 2 (A) | 000 | 000 | 000 | 000 | 000 | 000 | 000 | 001 |
| 3 (B) | 000 | 000 | 001 | 001 | 010 | 011 | 100 | 101 |
| 4 (A) | 001 | 001 | 001 | 001 | 001 | 001 | 001 | 001 |

FIG. 7B SEGMENT/BLOB MEMORY DATA

MEMORY ADDRESS

| LINE NUMBER | 000 | 001 | 010 | 011 | 100 | 101 |
|---|---|---|---|---|---|---|
| 3 | 0 | 513 | 0 | 514 | 0 | 512 |
| 4 |  | 513 |  |  |  |  |

FIG. 7C BLOB DATA

PIXEL POSITION NUMBER

| LINE NUMBER | 0 | 1 | 2 | 3 | 4 | 5 | 6 | 7 |
|---|---|---|---|---|---|---|---|---|
| 0 | 512 | 512 | 512 | 512 | 512 | 512 | 512 | 512 |
| 1 | 512 | 512 | 0 | 0 | 512 | 1 | 1 | 512 |
| 2 | 0 | 0 | 0 | 0 | 0 | 0 | 0 | 512 |
| 3 | 0 | 0 | 513 | 513 | 0 | 514 | 0 | 512 |
| 4 | 513 | 513 | 513 | 513 | 513 | 513 | 513 | 513 |

FIG. 7D BLOB ANCESTOR MEMORY DATA

| MEMORY ADDRESS | 0 | 1 | 2 | ... | 512 | 513 | 514 | ... | 1023 |
|---|---|---|---|---|---|---|---|---|---|
| BLOB DATA | 0 | 1 |  |  | 512 | 513 | 514 |  |  |

FIG. 7E FIFO DATA

| MEMORY ADDRESS | 0 | 1 | 2 | 3 ... 255 |
|---|---|---|---|---|
| BLOB LINK PAIR DATA | 0/1 | 514/513 | 512/513 |  |

| WHITE BLOB | BLOB LINK PAIR | WHITE BLOB ANCESTOR | WHITE OBJECT |
|---|---|---|---|
| 512 | →  | 512 | 128 |
| 513 → | (513/512) → | 512 | 128 |
| 514 → | (514/513) → | 512 | 128 |

FIG. 8A

| BLACK BLOB | BLOB LINK PAIR | BLACK BLOB ANCESTOR | BLACK OBJECT |
|---|---|---|---|
| 0 | → | 0 | 0 |
| 1 → | (1/0) → | 0 | 0 |

FIG. 8B

MEMORY ADDRESS

| | 0 | 1 | 2 | ... | 512 | 513 | 514 | ... | 1023 |
|---|---|---|---|---|---|---|---|---|---|
| BLOB DATA | 0 | 0 | | | 512 | 512 | 512 | | |

FIG. 8C  BLOB ANCESTOR MEMORY DATA

MEMORY ADDRESS (BLOB NUMBER)

| | 0 | 1 | 2 | | 512 | 513 | 514 | | 1023 |
|---|---|---|---|---|---|---|---|---|---|
| OBJECT DATA | 0 | 0 | | | 128 | 128 | 128 | | |

FIG. 8D  BLOB OBJECT MEMORY DATA

PIXEL POSITION NUMBER

| LINE NUMBER | 0 | 1 | 2 | 3 | 4 | 5 | 6 | 7 |
|---|---|---|---|---|---|---|---|---|
| | 128 | 128 | 128 | 128 | 128 | 128 | 128 | 128 |
| | 128 | 128 | 0 | 0 | 128 | 0 | 0 | 128 |
| | 0 | 0 | 0 | 0 | 0 | 0 | 0 | 128 |
| | 0 | 0 | 128 | 128 | 0 | 128 | 0 | 128 |
| | 128 | 128 | 128 | 128 | 128 | 128 | 128 | 128 |

FIG. 8E  OBJECT DATA

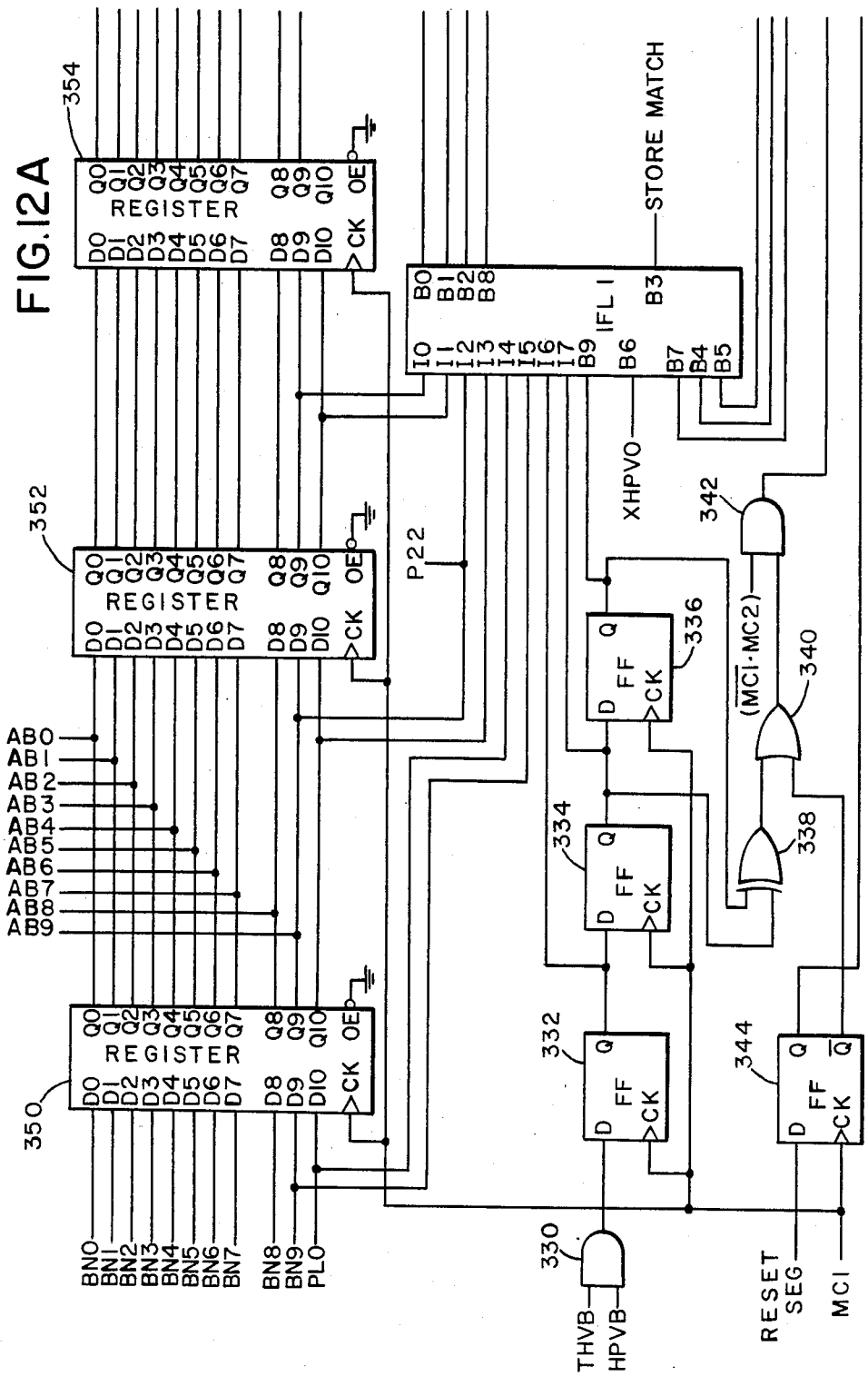

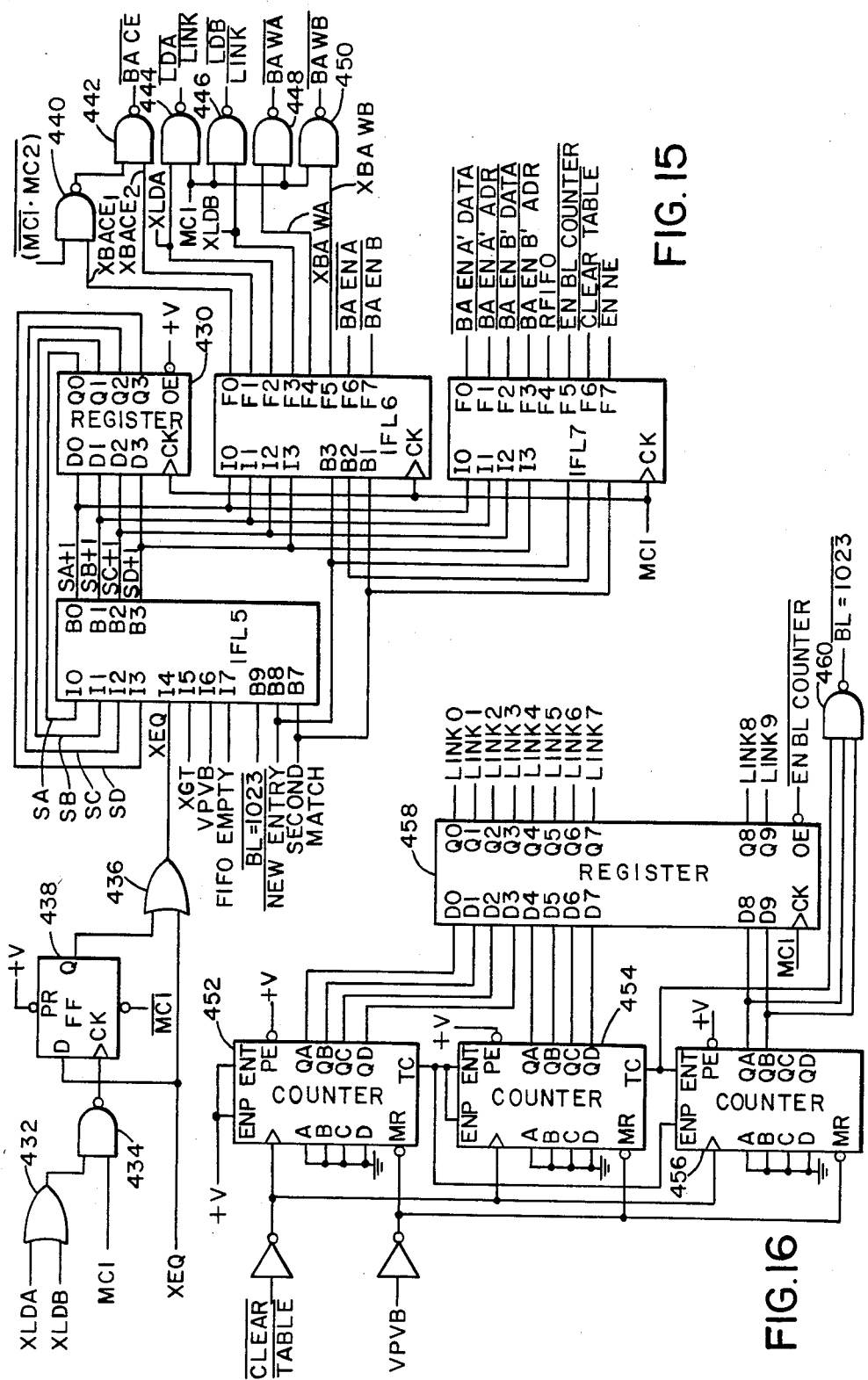

FIG. 20

BLOB LINKING STATE MACHINE
ACTIONS PER STATE

| | PAL OUTPUT SIGNAL | 0 | 1 | 2 | 3 | 4 | 5 | 6 | 7 | 8 | 9 | 10 | 11 | 12 | 13 | 14 | 15 | NEW ENTRY $\overline{BL/ED}$ | NEW ENTRY BL/ED |
|---|---|---|---|---|---|---|---|---|---|---|---|---|---|---|---|---|---|---|---|
| PAL 6 F0 | $\overline{XBA\ CE}$ | o | o | o | – | – | – | – | o | – | – | – | – | – | – | o | – | – | – |
| PAL 6 F1 | XBA CE | o | o | o | o | – | o | o | o | – | o | o | o | – | – | o | – | – | – |
| PAL 6 F2 | XLDA | o | o | o | – | – | o | o | o | o | o | o | o | o | o | o | o | o | o |
| PAL 6 F3 | XLDB | o | o | o | o | o | – | – | o | o | o | o | o | o | o | o | o | o | o |
| PAL 6 F4 | XBA WA | – | – | o | o | o | o | o | o | – | – | – | – | – | – | o | o | o | – |
| PAL 6 F5 | XBA WB | o | o | o | o | o | o | o | o | o | o | o | o | o | o | o | – | – | – |
| PAL 6 F6 | $\overline{BA\ EN\ A}$ | – | – | – | o | – | – | – | – | o | o | – | – | o | – | o | – | – | – |
| PAL 6 F7 | $\overline{BA\ EN\ B}$ | – | – | – | – | – | o | – | – | – | – | o | – | – | o | – | – | – | – |
| PAL 7 F0 | BA EN A' DATA | – | – | – | – | – | – | – | – | – | – | – | o | o | o | – | – | – | – |
| PAL 7 F1 | BA EN A' ADR | – | – | – | – | – | – | – | o | o | o | o | – | – | – | – | – | – | – |
| PAL 7 F2 | BA EN B' DATA | – | – | – | – | – | – | – | o | o | – | – | – | – | – | – | – | – | – |
| PAL 7 F3 | BA EN B' ADR | – | – | – | o | o | o | o | o | o | – | o | o | o | o | o | o | o | o |
| PAL 7 F4 | RFIFO | o | o | – | – | – | – | – | – | – | – | – | – | – | – | o | o | – | – |
| PAL 7 F5 | EN BL COUNTER | – | o | – | o | – | – | – | o | – | – | – | – | – | – | o | – | – | – |
| PAL 7 F6 | CLEAR TABLE | – | – | – | – | – | – | – | – | – | – | – | – | – | – | – | o | – | – |
| PAL 7 F7 | EN NE | – | – | – | – | – | – | – | – | – | – | – | – | – | – | – | o | o | o |

METHOD AND APPARATUS FOR HIGH-SPEED PROCESSING OF VIDEO IMAGES

BACKGROUND OF THE INVENTION

The present invention relates to a novel method and apparatus for high-speed processing of binary video image data into "blob" information for identification of image objects. More specifically, the present invention relates to a novel method and apparatus for the high-speed processing of video images comprised of discrete scan lines of individual digitized pixels into blob information; i.e. shapeless blotches of digitized pixels in the video image which form regions of downward ordered connectivity of pixels of the same binary value. Blob information is converted into corresponding object data for use in applications such as machine vision inspection systems. Data provided in blob or object form is utilized in the system for system image processing decision and control It therefore is an object of the present invention to provide a novel and improved method and apparatus for highspeed processing of video images.

SUMMARY OF THE INVENTION

A scene is scanned by a camera which generates a video image of the scene. The video image is generated by the camera is provided as an image frame wherein the image frame is comprised of two identical fields of pixel data. The first field is provided sequentially line by line and within each line pixel by pixel from the camera. Each pixel is then quantisized to a logical "0" for a black pixel or a logical "1" for a white pixel by a threshold detector.

Each line of pixels is converted into segments with an associated binary value. Segments are defined as a length of contiguous pixels of the same color on a single line. White pixel segments are assigned a binary number with the least significant bit a logical one while the black pixel segments are assigned a binary number having the least significant bit a logical zero. Segments by their nature will be alternately black and white segments. Therefore, it is easily determined as to whether a segment is a white segment or a black segment by the state of the least significant bit of the assigned segment number. Each pixel in a line has an assigned pixel horizontal address in the line used in storing the segment number assigned the particular pixel. Veritcally aligned pixels in the following lines each have the same pixel address.

Each segment of the first line of pixels is assigned a blob number. All blobs on the first line are new blobs and are sequentially assigned a blob number according to color. Each new blob is also initially assigned as its own ancestor blob number. Each segment of a subsequent or present line of pixels is compared pixel by pixel to a pixel immediately above in the image for corresponding white or black segments of the previous line. If during the pixel comparison any of the pixels in the present line have the same polarity, white or black, as a pixel of the previous line, the segment in the present line is assigned the same blob number as the segment of the previous line.

If any of the pixels of a present line segment do not have the same polarity as the pixels of segment in the previous line in the pixel by pixel comparison, the new segment begins a new blob and is assigned the next available blob number. Therefore, all segments from a previous and a present line are of the same blob and are therefore stored as having the same blob number.

If a segment in a present line is assigned a blob number, and is found also to be connected by polarity of additional segments of another blob in the previous line, the segment in the present line will retain the blob number of the earlier blob. However, both blob numbers of the second or additional matches will be identified and stored as a blob link-pair. Therefore, a blob link-pair is identified by segments having a different blob numbers but matching in polarity.

During the video period of the first field and before the beginning of the second field, the blob link-pairs are analyzed one by one. An object can be comprised of several blobs, each of which has its own ancestor. During the upward connectivity operation, blobs are analyzed to determine the ultimate ancestor of the blob. All blobs in the object have the same ultimate ancestor, i.e. the lowest blob number in the object. Upward connectivity analyzes the blobs and blob-link pairs to assign to the blobs of the same ultimate ancestor the same object number.

The invention, with the optional buffer, analyzes images at the full rate they are generated by the source. For a standard NTSC camera 60 independent pictures per second can be analyzed. The results of this invention are sent to other system components for further analysis with no loss of speed of the invention.

BRIEF DESCRIPTION OF THE DRAWINGS

FIGS. 2A-2B, 3A-3D, 4A-4D, 5A-5E, 6A-6E, 7A-7E and 8A-8E illustrate the processing of video image data in the present invention;

FIGS. 12a and 12b is a schematical diagram of the downward connectivity circuitry;

FIG. 15 is a schematical diagram of the blob linking control circuitry;

FIG. 16 is a schematical diagram of the blob number generator for the blob ancestor information transfer;

FIG. 20 is a chart of state machine actions per state.

DETAILED DESCRIPTION OF THE PREFERRED EMBODIMENTS

Figure 1:
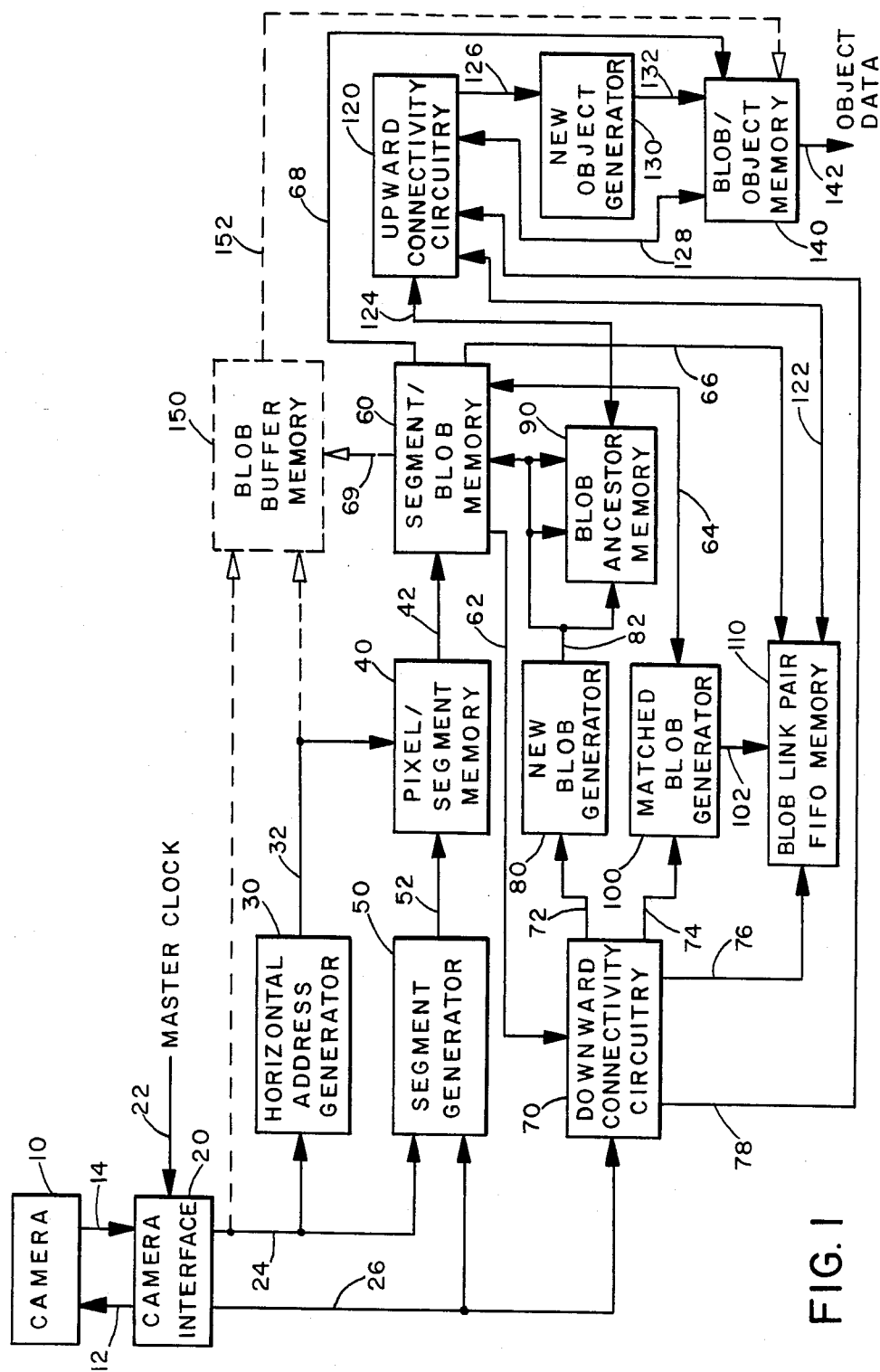
FIG. 1 is a functional block diagram of a preferred embodiment of the video image processor of the present invention.

Referring now to the drawings, FIG. 1 illustrates a functional block diagram of the preferred embodiment of the present invention. In FIG. 1, camera 10, typically a charge couple device (CCD) camera, generates an optical image of an object or objects under inspection. Camera 10 synchronously raster scans the object under inspection line by line, and within each line pixel by pixel. Camera 10 generates two non-interlaced identical fields per frame. Each field is divided into 244 lines with each line comprised of 320 pixels. Therefore each frame is comprised of a 320 by 244 pixel array. Although an exemplary 320 by 244 pixel array is used in the description herein, any size array may be processed by the invention when the image is presented in order top to bottom, left to right. Camera horizontal and vertical sync-signals along with pixel clock pulses are internally generated to camera 10. These signals are synchronized to a signal provided from camera interface 20 to camera 10 on line 12. Camera 10 provides on line 14 to camera interface 20 the line by line pixel data. Camera interface 20 detects the individual pixel data and converts the data into threshold video data. The threshold detecting requires the received pixel to be of an intensity greater than the threshold level for the pixel to be digitized as a logical "1". Should the pixel not exceed the threshold level it is assigned a logical "0". Therefore, white pixels in the image exceeding the threshold are assigned the logical "1" value while the black pixels not exceeding the threshold are assigned a logical "0" value. Camera interface 20 may include memories for storing the pixel data in each video field.

Master clock signals are provided externally on line 22 or may be generated on by camera interface 20 itself. Master clocks signals provided to camera interface 20 are used to generate the signal necessary to synchronize the signals provided to camera 10.

Camera interface 20 provides on line 24 to horizontal address generator 30 the camera interface synchronization signals, horizontal and vertical sync signals respectively referred to hereafter as Horizontal Pixel Valid (HPV) and Vertical Pixel Valid (VPV) signals, and the pixel clock signals referred to hereinafter as Master Clock 1 signal (MC1). Horizontal address generator 30 in response to the vertical picture valid signal, the horizontal picture valid signal and the pixel clock signal generates sequential pixel addresses for each pixel across each line. With each horizontal picture valid pulse, indicating a new line, horizontal address generator resets the pixel address to zero and begins counting in sequence upon each pixel clock pulse until reset at the beginning of the next line. Therefore, vertically aligned pixels in the field each have the same horizontal pixel address.

The vertical picture valid signal is provided at the beginning of the first pixel of the first line in the field and ends after the last pixel in the last line of the field. The vertical picture valid signal is provided for all fields in each frame. The horizontal picture valid sigal is provided prior to the beginning of the first pixel in each line and ends after the last pixel of each line. Pixels contain valid data when both the vertical pixel valid signal and the horizontal pixel valid signal are provided. A pixel clock signal is provided for each pixel in the lines.

The pixel address generated by horizontal address generator 30 is provided on line 32 to pixel/segment memory 40. Pixel/segment memory 40 is comprised of two separate memory sections addressed by the address from horizontal address generator 30. Horizontal address generator 30 also provides on line 32 to pixel/segment memory 40 an additional address bit which addresses one or the other of the memory sections.

Camera interface 20 provides on line 24 the horizontal picture valid signal to segment generator 50. Camera interface 20 provides on line 26 the threshold video pixels clocked by the pixel clock signal to segment generator 50. Segment generator 50 forms the binary segment numbers that individual pixels on the line are assigned to. Segments are defined as a length of contiguous pixels of the same color on a line. White segments, comprised of threshold video pixels of a logical "1" value, are numbered oddly, i.e. the least significant bit of the binary segment number being a logical "1". Black segments comprised of threshold video pixels of a logical "0" value are numbered evenly, i.e. the least significant bit in the binary segment number is a logical "0". The odd and even numbering scheme of the white and black segments allow the lowest order bit of the segment number to be used as a color or polarity indicator of the segment. When the first pixel of threshold video on the line is black, the pixel is assigned to segment number 0. If the first pixel in the line is white, it is assigned to a segment number 1. After the first segment, each segment is given the next number in sequence. In the embodiment of the present invention the segment numbers are an eight-bit word such that a total of 256 segments on a line may be handled.

The segment numbers are sent on line 52 to pixel/segment memory 40. The segment numbers are stored at the corresponding pixel address provided by the horizonal address generator 30. The storage of alternate lines of segments numbers is ping-ponged between alternate memory sections in pixel/segment memory 40. On one line of video data, one section of memory 40 is being written into while segment numbers stored from the previous line in the other memory section is being read out. On the following line of video data, the procedure is reversed.

Pixel/segment memory 40 provides the stored segment number corresponding to a pixel address on line 42 to segment/blob memory 60. The segment number on line 42 is used to address memory locations within segment/blob memory 60. Segment/blob memory 60 stores the blob number that is assigned to a segment for one line of pixel data. The stored line of blob numbers is provided on line 62 to downward connectivity circuitry 70.

In operation, for each line of pixel data a horizontal address is generated with the corresponding segment generated and read out. The segment number is used to read the assigned blob number from the segment/blob memory 60. The blob number found for the segment location in segment/blob memory 60 is read out to downward connectivity circuitry 70 where it is compared with the incoming threshold video pixel data for matches. Blob numbers stored within segment/blob memory 60 contain an identification as to whether the blob number is assigned to either a white or black blob. Downward connectivity circuitry 70 compares the blob number, which contains self identification as to the blob color, pixel by pixel with the threshold video provided on line 26 from camera interface 20 to downward connectivity circuitry 70.

If downward connectivity circuitry 70 does not find a match in color with the blob on the previous line with the pixels in the present segment, the present segment is assigned a new blob number. This new blob number is generated by a new blob number generator 80 and stored in segment/blob memory 60. If downward connectivity circuitry 70 does find a match in color of the blob on the previous line with the threshold video pixels in the present line, the blob number of the matched blob is stored for the segment on the present line in segment/blob memory 60.

Downward connectivity circuitry 70 analyzes the image and forms regions of downwardly connected pixels into blobs. A blob is generally defined as a region where all the pixels within the region can be reached from the uppermost pixel going down, left, or right but never in an upward direction. If an upward turn is required then the upward region is part of another blob. A three by three pixel kernel is used by downward connectivity circuitry 70 to determine the edges of objects. However, for the strict purpose of downward connectivity only two pixels are required. Downward connectivity circuitry 70 uses a threshold video pixel having a position in the present line and a blob number stored in segment/blob memory 60, corresponding to the pixel position in a previous line to determine whether there is a match in the polarity of the present line pixel. If the pixels are of a different color, there is no match. A new blob number is assigned and the process for analyzing the pixels for a match continues. If the pixel on the present line and the blob number having the color of the pixel on the line above implied therein are the same color, then there is a match and the present pixel is part of the blob in the previous line.

When downward connectivity circuitry 70 determines that there is no match in pixels at the present line segment with the blob of the previous line a signal is provided on line 72 to a new blob generator 80. The new blob generator assigns a new blob number to the pixels of the present line segment. New blob generator 80 provides on line 82 to segment/blob memory 60 the new blob number assigned to the segment for the present line. This new blob number is then used during the processing of the next line of pixel data. New blob generator 80 generates up to 1,024 blob numbers with the blob numbers 0–511 being assigned to the black blobs and blob numbers 512–1023 being assigned to the white blobs. Using this type of numbering scheme the most significant bit in the ten bit blob number word, is indicative of the color of the blob. For example, in a blob composed of black pixels the most significant bit of the blob number word is a logical "0" while in a blob comprised of white pixels the most significant bit of the blob number word is a logical "1".

New blob generator 80 also provides on line 82 the blob number to blob ancestor memory 90. The blob number is stored within blob ancestor memory 90 at a memory location corresponding to the blob number itself. Initially new blob numbers are stored in blob ancestor memory 90 as being its own ancestor. However, through upward connectivity of the image, a blob previously assigned itself as an ancestor may yet be part of another blob. In this case the previous blob ancestor becomes the ancestor of the later blob.

In the processing of the present line pixel data, downward connectivity circuitry 70 provides a control signal on line 74 to matched blob register 100 when a match occurs. Match blob register 100 receives on line 64 from segment/blob memory 60 the blob number which occurred on the previous line at which the present line pixel is of the same color. Match blob register 100 upon receiving the control signal on line 74, provides on line 64 to segment/blob memory 60, the blob number of the previous line to the segment of the present line. Storage of the blob numbers occurs at the end of the present line segment. This matched blob number is stored in segment/blob memory 60 for use in the processing in the downward connectivity circuitry 70 on the next line of pixel data.

If there is a match in the color of the pixels in the present line segment and two or more different blobs of the same color on the previous line, the segment is assigned the blob number of the first match. A blob-link pair occurs upon the second or additional match. The blob number assigned the present line segment along with the blob number of the previous line blob form a blob-link pair. Upon the occurrence of a second or additional match, a control signal is provided on line 76 from downward connectivity circuitry 70 to blob link pair first-in-first-out memory (FIFO) 110. Upon receiving the command on line 76, FIFO 110 stores the blob number stored in matched blob register 100 provided on line 102 as one blob in a blob-link pair. FIFO 110 upon receiving the signal on line 76 also reads and stores the blob number in the previous line as the other blob number of the blob-link pair. The other blob of the blob-link pair is provided to FIFO 110 from memory 60 on line 66.

Downward connectivity circuitry 70 also provides a control signal on line 78 to upward connectivity circuitry 120. This signal halts the operation of a state machine in upper connectivity circuitry 120. As a result, upward connectivity circuitry 120 is temporarily inhibited from retrieving blob-link pair data on line 122 from FIFO 110.

After the blobs are formed by the downward connectivity circuitry, the blobs must be linked together into objects by upward connectivity circuitry 120. As described earlier when two blobs are found to be touching in the downward connectivity circuitry 70, a blob link pair consisting of the two blob numbers of the touching blobs are sent and stored in the blob link pair FIFO 110. Upward connectivity circuitry 120 analyzes the blob link pairs one by one to generate upward connectivity of all blobs into objects.

As each blob is assigned, the blob is assigned itself as its own ancestor. Since an object can be comprised of several blobs, all blobs after processing by the upward connectivity will have the same ancestor, i.e. namely the lowest numbered blob in the object.

The upward connectivity includes control circuitry for requesting the next blob link pair on line 122 from FIFO 110. The first blob in the blob link pair is sent as the address through upward connectivity circuitry 120 to the blob ancestor memory with the ancestor being provided on line 124 to upward connectivity circuitry 120. If the blob retrieved from blob ancestor memory 90 is determined to be its own ancestor, then the ultimate ancestor for the first blob of the blob link pair has been found. However, if the blob is not its own ancestor, then the ancestor is used as the address to the blob ancestor memory 90 with its ancestor found. This process continues by going through the path of the ancestors until an ancestor blob that is its own ancestor is found. This process results in the ultimate ancestor of the first blob of the blob link pair being discovered. The process is repeated for the second blob of the blob link pair to find its ultimate ancestor. The processing of blob link pairs occurs at the same time as new video data is input to the system during the same field.

The upward connectivity circuitry 120 uses the lowest number blob as the new ancestor to guarantee a unique single blob as the ancestor for the object. The lower numbered ultimate ancestor is stored as the ancestor for the first blob and second blob of the blob link pair in memory 90. Also, the lowered number ultimate ancestor is stored as the ancestor of the higher numbered ultimate ancestor which is no longer an ultimate ancestor. As all the blob link pairs are processed, all the blobs are connected into common groupings of a single common ultimate ancestor.

Although it is sufficient to assign the higher numbered ultimate ancestor the ancestor of the lower numbered ancestor, speed up to techniques can be utilzed. By assigning the lower number ultimate ancestor to the first and second blobs of the blob link pair, the processing of the blobs eliminates the possibility of traveling through the paths of ancestors more than once.

Not all blobs will be assigned an ancestor of the ultimate ancestor. If the blob was skipped or joined unto a path, then it will have an ancestor that is not the ultimate ancestor. However, this blob will always have a lowered numbered ancestor blob whose ancestor leads to the proper ultimate ancestor.

During the vertical blanking period upward connectivity circuitry 120 converts the blob numbers into object numbers. Upward connectivity circuitry 120 goes through the blobs in sequential order from blob number 0 to blob number 1023. As each blob is read, the ancestor of the blob is compared to the read blob. If the ancestor is the same as the blob, then upward connectivity circuitry 120 provides a control signal on line 126 to new object generator 130. New object generator 130 generates an object number which is provided on line 132 to blob/object memory 140. The address location at which the new blob number is stored within blob/object memory 140 is the address provided on line 128 from upward connectivity circuitry 120 to blob/object 140 which corresponds to the read blob number. If the read blob number is not its own ancestor the object number of the ancestor is read from blob/object memory 140 by upward connecting circuit 120 and stored at the memory location addressed by the read blob number. This process is repeated until all blobs in the image have been assigned object numbers.

As the blobs are generated during the next field they are sent on line 68 directly to blob/object memory 140 where they address the object number for the generated blob number. The object read out of blob/object memory 140 on line 142 is the object number assigned to the blob and therefore correspond to the pixel that is presently being scanned.

Figure 2A:
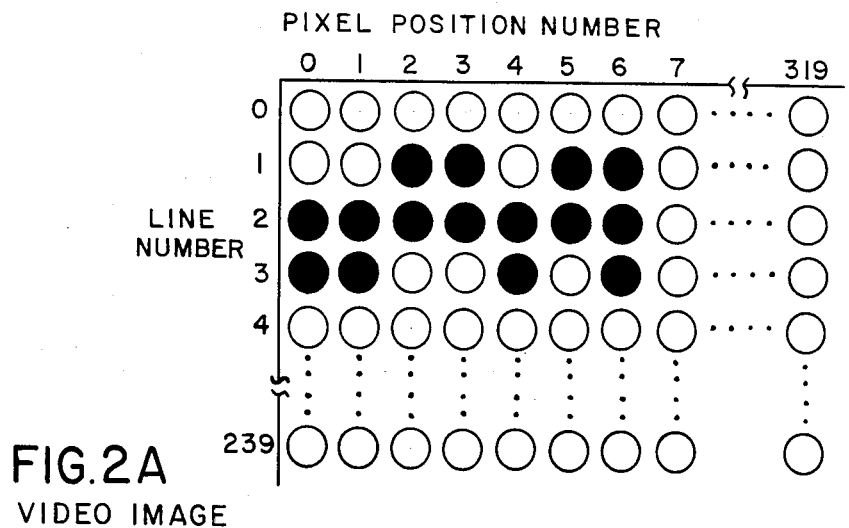
Figure 2B:
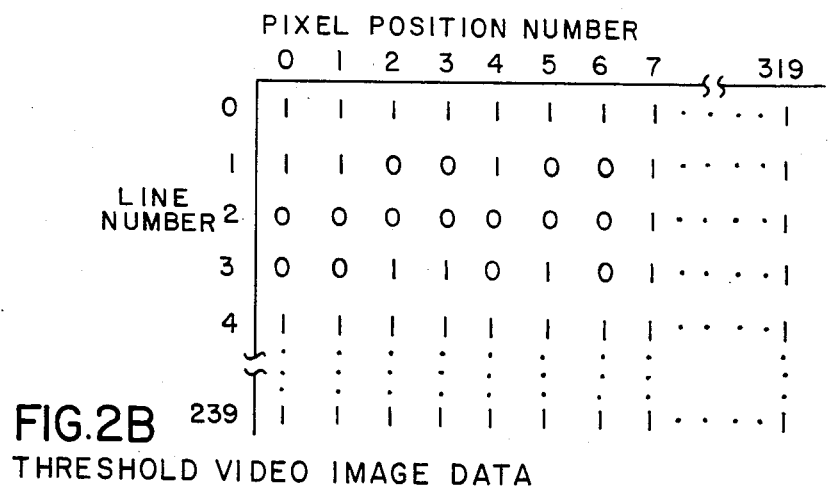

Referring to FIG. 2 there is shown in the graphical illustrations of FIGS. 2A and 2B, the processing of pixel data in the system. In FIG. 2A, a video image of a black object at the upper left corner of the video field is generated. The video image is formed in a 320 by 240 pixel array. The field is typically generated by a raster scan of the image such that the video image is formed by a horizontal line of pixels from 0-319 with the next line beginning below the previous line and at the 0 pixel position. In FIG. 2A, an exemplary image is formed by pixels in lines 0-4 at pixel positions 0-7. Lines 1 and 4 contain pixels all of a white color while lines 1-3 are comprised of both black and white pixels. In lines 2 and 3 the image of FIG. 2A the object associated with the black pixels touch the edge of the picture.

FIG. 2B illustrates the image of FIG. 2A converted into threshold video pixel data. The image of FIG. 2A is digitized into binary numbers with the white pixels exceeding a predetermined threshold level in brightness being assigned a logical "1" value. The darker pixels below the threshold level are assigned the value logical "0" value.

The threshold video pixel data is provided under the clocking of the pixel clock pulses. Each clocking of the pixel clock forces the horizontal address generator to begin counting and generate a ten bit binary address. This address directs the storage of the segments numbers corresponding to pixel data into the pixel/segment memory. The most significant bit of the ten bit binary address directs the storage of the segment numbers corresponding to each pixel position between two memory sections of the pixel/segment memory.

Referring to FIG. 3A, the first line of threshold video (line 0) is converted into a segment number which is stored at each of the pixel position memory locations within the pixel/segment memory. Since line 0 of the threshold video image data are all white pixels the least significant bit of an eight bit binary segment number is a 1 with the remaining bits 0. This segment number is stored in pixel position address location 0-7 of memory section A. For the exemplary purposes only the three least significant bits of the segment numbers are shown.

Correspondingly, the downward connectivity circuitry for the first line segment generates a new nine bit blob number, 512, for the white blob which corresponds to segment 001. The blob number 512 is stored in the segment/blob memory at the 001 memory location addressed by the segment number 001. Since each pixel in line 0 is of the same segment this implies that all pixel positions within the first line contain the same blob number as illustrated in FIG. 3C.

When a new blob is created, and corresponding blob number generated, the new blob is assigned itself as its own ancestor. In line 0, the new blob 512 was generated and is stored in the blob ancestor memory location as addressed by its own blob number. FIG. 3D illustrates the blob number 512 being stored at the blob ancestor memory location addressed by the blob number 512.

During the next scan line of threshold video the line segment numbers are generated for line 1 as was done with reference to line 0. However, this segment data is stored in the other pixel/segment memory section dictated by a change in state of the most significant bit of the binary address to the pixel/segment memory. FIG. 4a illustrates the storage of both lines 0 and 1 segment data respectively in memory sections A and B at the corresponding pixel position. Since line 1 also begins with a white pixel the first segment in line 1 begins with a 1 in the least significant bit position on the eight-bit binary segment number. However, at pixel position 2 a a new segment is began when a black pixel is detected. The segment generator in response to the detection of a change in the threshold pixel value increments the previous segment number by one digit. The new segment number is stored in the pixel/segment memory locations addressed by the address corresponding to pixel positions 2 and 3. Similarly, at pixel position 4 a new segment is begun, while new segments are also generated for pixel positions 5 and 7. The least significant bit in the segment numbers correspond to the color of the pixels comprising the segment. The least significant bit in the segment numbers are still 0 for black pixels and 1 for white pixels.

The white pixels of line 1 are compared in color with the pixels of the line 0 by the downward connectivity circuitry. Matched pixels are assigned the same blob number for the pixel position as to which they are matched.

The blob number of line 0 is read out of the segment/blob memory as addressed by the segment number 001. The segment number 001 was stored in the pixel/segment memory at all pixel position memory locations, to address the segment/blob memory for each pixel position during line 1. FIG. 4B illustrates for line 0 the stored segment numbers addressed by the pixel position address with the segment numbers addressing the stored blob numbers. For line 0, the segment numbers are used to address the memory locations in the segment/blob memory in which the blob numbers are stored. The black pixels which occur at pixel positions 2 and 3 generate a new blob, a black blob which is assigned in the ten bit binary blob number as a 0 blob number. Similarly, the black pixels occurring in pixel positions 5 and 6 generate a new black blob number 1.

The blob numbers are ordered with blob numbers 0-511 and 512-1023, in their corresponding ten-bit binary representation respectively, as black and white blobs. The most significant bit of the blob number indicates the color of the blob at a pixel position for matching with a present line of threshold video pixel data. FIG. 4C illustrates the blob number impliedly corresponding to each pixel position in lines 0 and 1.

FIG. 4D illustrates the storage of the black blobs 0 and 1 at the respective memory locations 0 and 1 within the blob ancestor memory. The blob ancestor memory also retains the white ancestor blob 512 at the 512 memory location.

FIG. 5A illustrates the line 2 segment number data being stored in the pixel/segment memory section A, thereby writing over the segment number data from line 0 (written over data is illustrated as phantom numbers in line 0). Since the first pixel in line 2 is a black pixel, the segment generator generates a segment number 000 for the pixels within the black segment located at pixel position 0-6. The white pixel at pixel position 7 begins a new segment number 001. The polarity or color of the segment is still indicated by the least significant digit of the segment number.

FIG. 5B illustrates the blob numbers read out of the segment/blob memory for use by the downward connectivity circuitry. Also illustrated are the blob numbers stored for the segment number addressing the segment/blob memory for line 2.

FIG. 5C illustrates the blob numbers corresponding to each pixel position in lines 0-2. The blob number assigned to the black pixels on line number 2 in the blob number of the first matching blob. In this case the first match occurs at pixel positions 2 and 3. The entire segment 000 is assigned the blob number 0 corresponding to the first black blob occurring in line 1.

Since there is no new ancestor added to the blob ancestor memory, the data in the memory remains the same as before the processing of the line. The blob ancestor memory data is illustrated in FIG. 5D. The second match, which occurs at pixel positions 5 and 6 is stored in the blob-link pair FIFO at the memory location 0. FIG. 5E illustrates the FIFO memory data. FIG. 6a illustrates the line 3 segment data being stored in pixel/segment memory section B, thereby writing over the segment number data of line 1. In line 3 new white blobs are generated for pixels positions 2-3 and 5. In all other pixel positions a match has occured in color of the present line pixel data with the color of the previous line blob. These blob numbers are stored at the segment number address locations in the segment 1 blob memory as illustrated in FIG. 6B.

FIG. 6C illustrates the blob data implied in corresponding pixel positions for lines 0-3.

In line 3 new black blobs are stored as their own ancestors. Blobs 513 and 514, are stored at their own memory locations within the blob ancestor memory as illustrated in FIG. 6D.

FIG. 6E illustrates the retention of blob link pair data in the FIFO memory until read out by the upward connectivity circuitry. After read out the data may be written over.

FIG. 7A illustrates the line 4 segment data being written over the pixel positions in pixel/segment memory section A which previously stored the data of line 2.

Line 4 is comprised of a single white segment which is assigned the blob mumber 513 and stored at the segment number 001 in segment/blob memory as illustrated in FIG. 7B.

The segment number 001 is assigned the blob number of the first match with the previous line data. In this case the first match is the blob number 513. The second and third blob matches occur at pixel positions 5 and 7 with the matches respectively stored as blob link pairs 514/513 and 512/513 in the blob-link pair FIFO. The blob link pairs 514/513 and 512/513 are respectively stored at the FIFO memory locations 1 and 2 as illustrated in FIG. 7E. Since no new blobs are generated in the line 4, the blob ancestor memory remains the same with no new additions and is illustrated in FIG. 7D.

With reference to FIG. 7C, it can be seen that downwardly connected blobs form five distinct blobs 160, 170, 180, 190 and 200 as contained within the dashed lines. The forming of the blobs completes the formation of downwardly connected pixels into blobs.

The upward connectivity circuitry begins when the FIFO is not being used by the downward connectivity circuitry and there is data in the FIFO. The upward connectivity circuitry begins to upwardly connect pixels to complete the merging of adjacent blobs into the same object. The upward connectivity circuitry using the blob ancestor memory goes through the blobs and determines the ultimate ancestor of the blob. Upward connectivity circuitry assigns an object number of the blob if the blob is determined to be its own ancestor.

In FIGS. 8A and 8B the white blobs and black blobs are processed to determine the ultimate ancestors of the blobs. Black objects are numbered 0-127 and white objects are numbered 128-255. These blob numbers are typically generated as an eight bit binary word. In this case, the blob 512 is its own ancestor with blobs 513 and 514 all being assigned the ultimate ancestor 512. Blob 512 being its own ancestor and is assigned as a white object with object number 128. All blobs which have blob 512 as an ancestor are part of the white object having object number 128. The black blobs 0 and 1 are all assigned to the black blob ancestor 0 and are assigned to the black object number 0. The ancestors are stored in the blob ancestor memory, as illustrated in FIG. 8c, wherein the ancestors of blobs 0 and 1 at the blob address location are assigned the 0 blob number as the blob ancestor. The blob addressed at the memory locations 512, 513 and 514 are all assigned the the 512 blob number as the blob ancestor. The object numbers corresponding to the blob numbers are then stored in the blob/object memory as illustrated in FIG. 8D.

Figure 9:
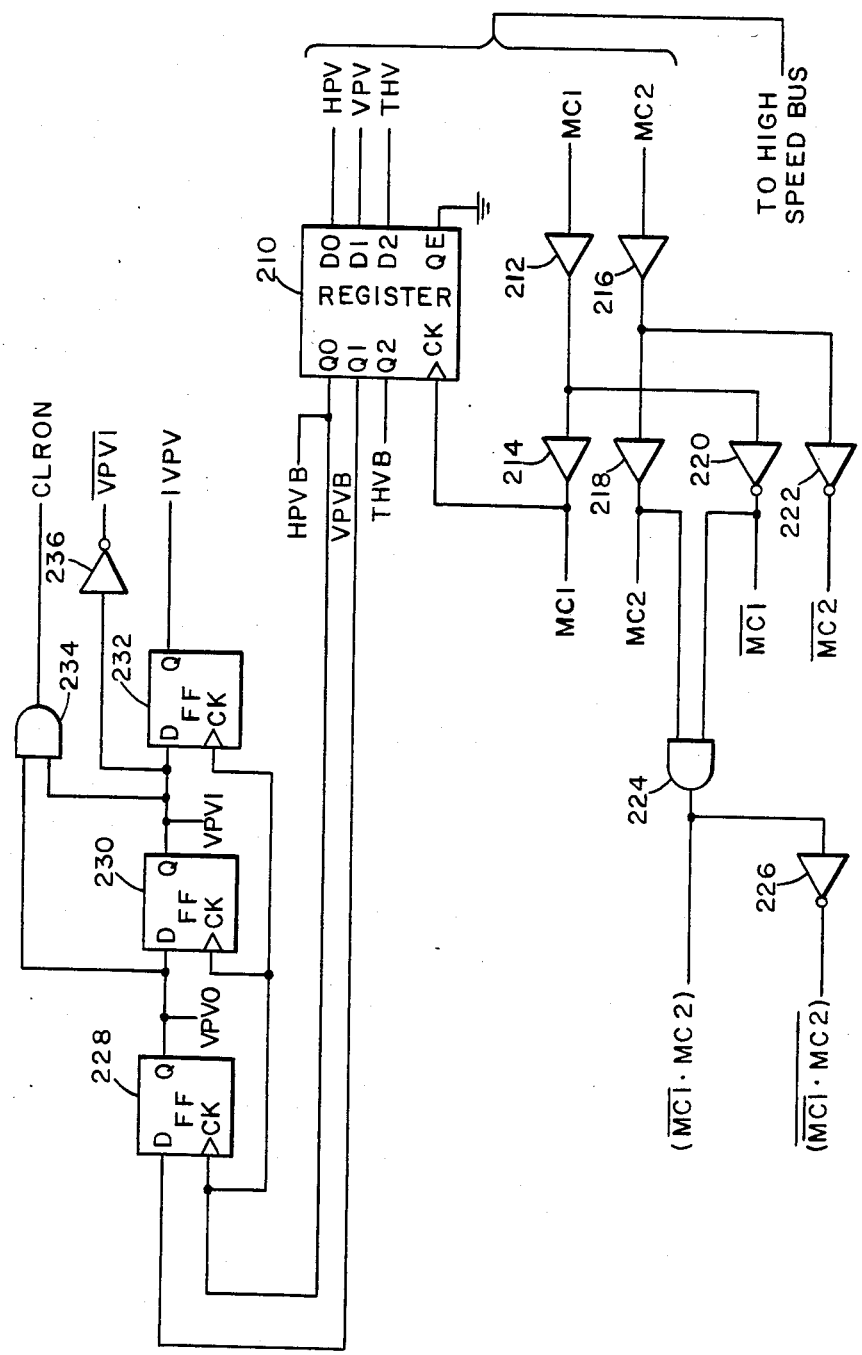
FIG. 9 is a schematical diagram of control signal generators and control signal/bus interfaces.

During the next field of video, as the blob numbers are generated the corresponding object number is addressed in the blob/object memory. Since the data is clocked into the system pixel by pixel, the blobs are generated such that the pixel number is implied in the generated blob. As such, with each blob generated the object number for the pixel position is read out of the blob/object memory. FIG. 8E illustrates a readout of the image as object data with respect to pixel position. The object data may then be used by a processor to compare the data with a "golden" object data and make a control decision therefrom. FIG. 9 illustrates the interconnect circuitry which generates signals required for the processing of the pixel data. The horizontal pixel valid (HPV) signal, the vertical pixel valid (VPV) signal and the threshold video pixel data (THV) are received from a high speed bus into register 210. The horizontal pixel valid signal goes high at the occurence of the first pixel at the beginning of a horizontal line and low at the end of the line after the last pixel. The vertical pixel valid signal goes high at the occurence of the first pixel at the beginning of a field of pixels and low after the last pixel in the field.

The threshold video pixel data is clocked pixel by pixel from the camera interface board under the timing of the master clock (MC1). The master clock signal (MC1) is provided on the high speed bus to the processing circuitry along with a second master clock signal (MC2) which is the same frequency as master clock signal (MC1) but is 90 degrees delayed from master clock signal (MC1). The frequency of the MC1 and MC2 signals is 6 MHz.

The signals MC1 and MC2 are coupled through a series of logic gates 212-226 to buffer and generate additional timing signals used in the processing of the threshold video pixel data. The clock signal MC1 clocks register 210 to provide the buffered horizontal pixel valid (VPVB) and vertical pixel valid (VPVB) signals to a series of flip-flops 228-232 and logic gates 234-236 to generate additional timing signals.

Figure 10:
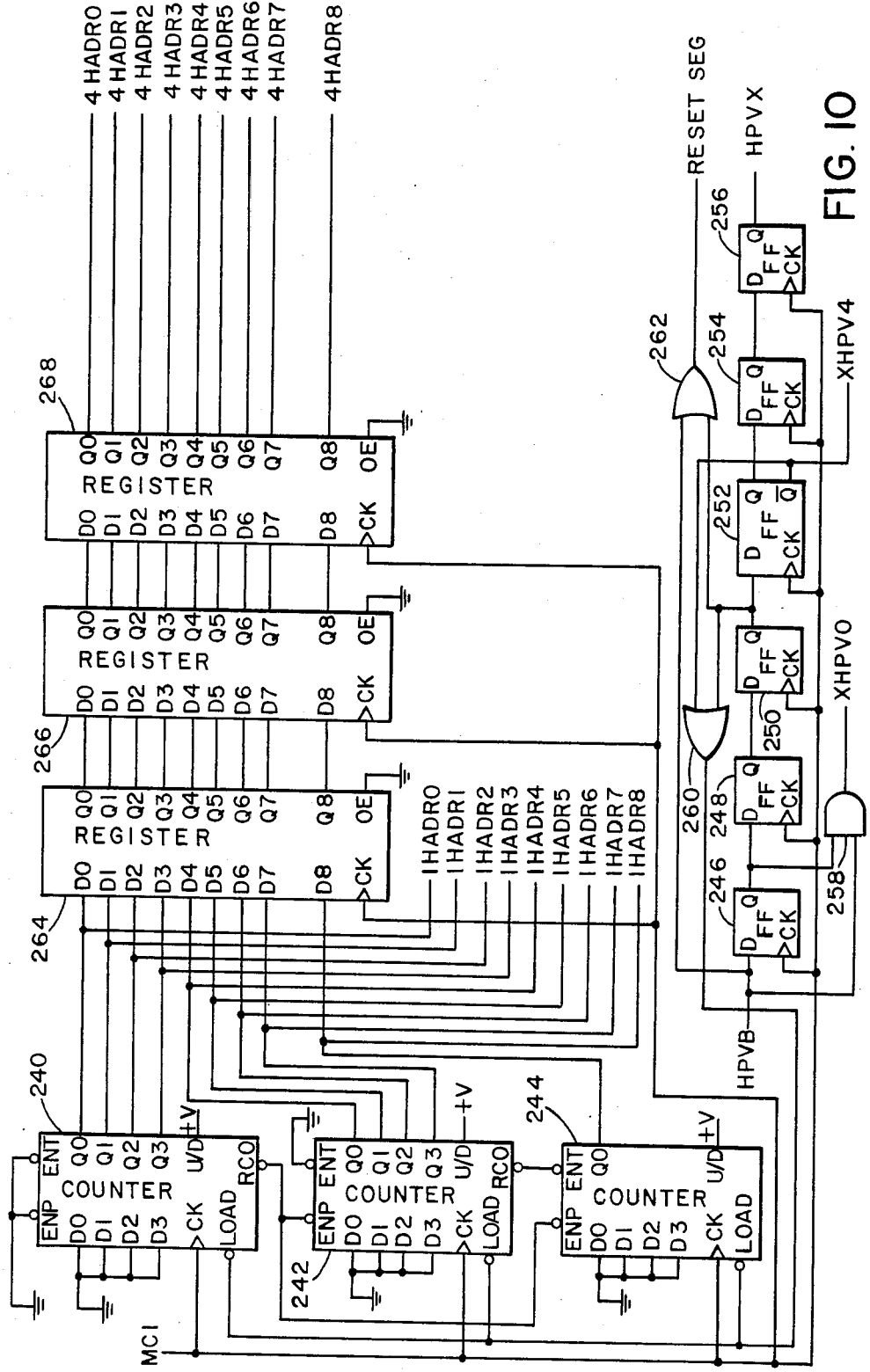
FIG. 10 is a schematical diagram of the horizontal address generator circuitry.

FIG. 10 illustrates the horizontal address generator which includes cascaded counters 240, 242 and 244. Counters 240, 242, and 244 under the control of the clock signal MC1 generate the address location of each pixel across the horizontal line. The counters are reset to provide a zero output at the start of each horizontal line. The signal from output of gate 260 provided to the load input of the counters is used to reset the counters. The counter reset signal and additional signals are generated by the series of flip-flops 246-256 and logic gates 258-62. The generation of the reset signal to counters 420, 242, and 244 synchronizes the counters to the raster scanned threshold pixel data off of the high speed bus.

Counters 240, 242 and 244 generates a nine-bit address which is provided directly as the address 1HADR0-1HADR8. The output of counters 240, 242 and 244 are clocked through registers 264, 266 and 268 to provide three clock period delayed address signal of 4HADR0-4HADR8.

The horizonal address of each pixel is delayed for proper operation of the ping-ponged pixel/segment memories by registers 264-270. The address 1HADR0-1HADR8 is not delayed and is used to read out the information from the pixel/segment memory for the previous line. The address 4HADR0-4HADR8 is delayed by three clock cycles and is used to write segment information of the present line into the pixel/segment memory. Since the processing of threshold video pixel data takes one line and several pixels of the next line to process the image, the output of the system is delayed by that amount. The signal HPV1 provided from flip-flop 256 accounts for this delay to other components of the system. The signal VPV2 has output from flip-flop 232 of FIG. 9 is generated from the signal VPVB to account for the vertical line delay in the processing of the image.

Figure 11A:
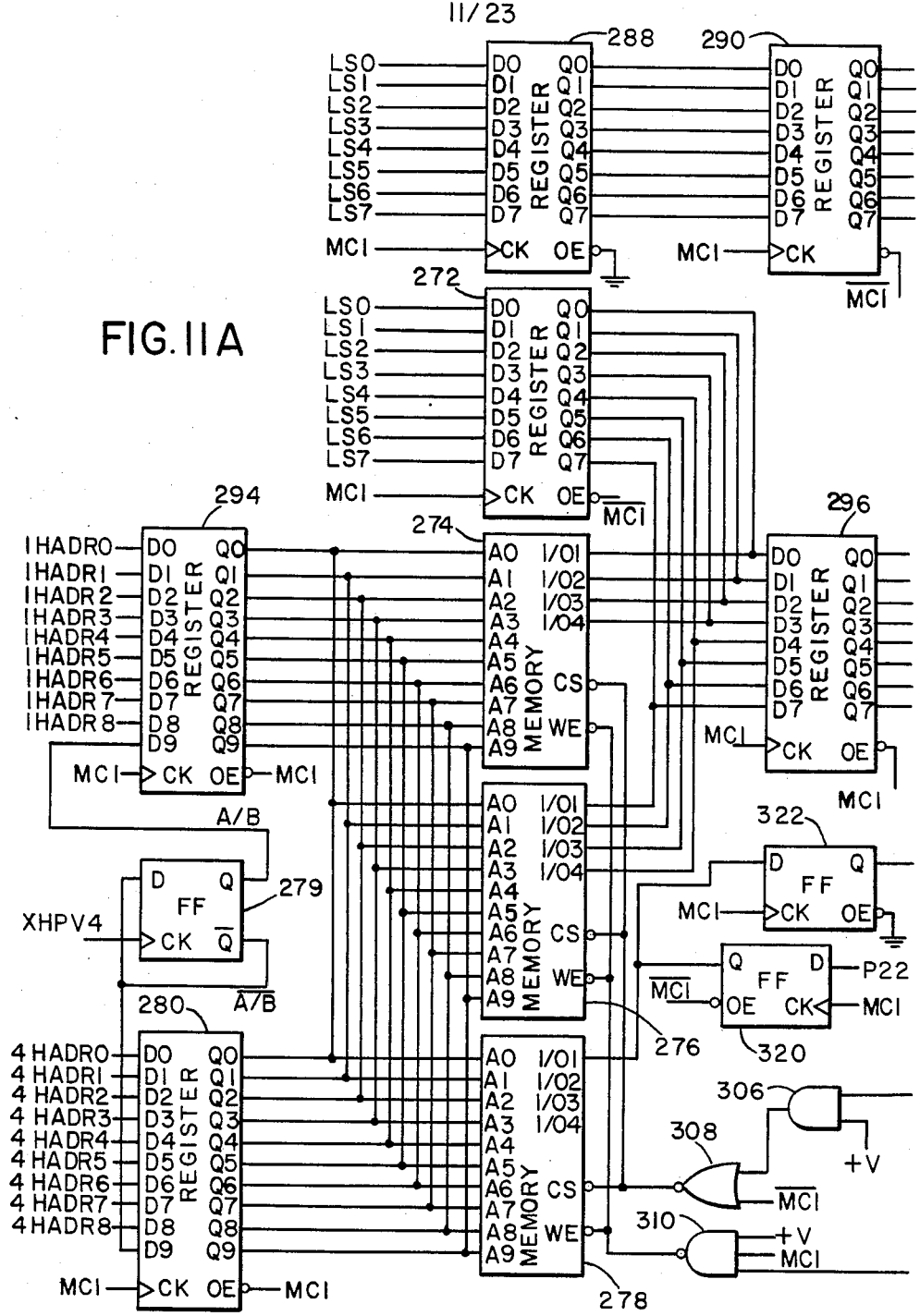
FIGS. 11a and 11b is the pixel/segment memory and the segment/blob memory circuitry.
Figure 11B:
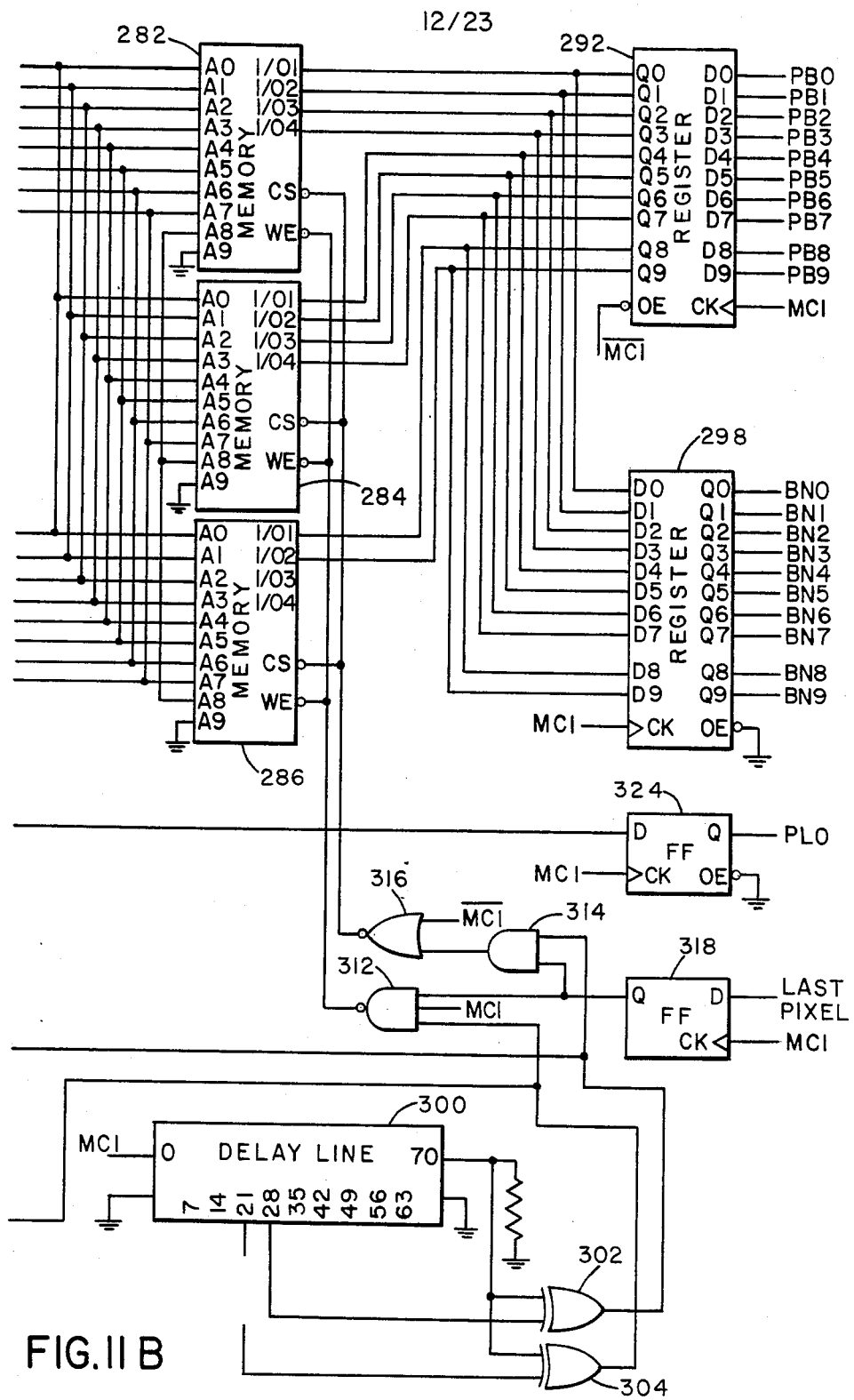

FIGS. 11A-11B illustrate the pixel/segment memory and the segment/blob memory. These memory circuitry provide the one and two line delay needed to store data for comparison by the downward connectivity circuitry. This circuitry includes the storage of a three by three kernel of pixel data required by the downward connectivity circuitry to determine the edge of objects.

As each horizontal pixel is assigned to an eight-bit segment number, LS0-LS7, by the downward connectivity circuitry, the segment number is provided through register 272 to the data inputs of a pixel/segment memory comprised of memories 274, 276 and 278. The present pixel address 4HADR0-4HADR8 along with a signal A/B from flip-flop 279 are provided through register 280 to address memories 274, 276 and 278.

At the end of each segment, the blob number that is assigned to the present segment number, as indicated by the segment number LS0-LS7, is stored in a segment/blob memory comprised of memories 282, 284 and 286. The memories 282, 284 and 286 are addressed by the present segment number LS0-LS7 delayed by two MC1 clock cycles. The present segment number LS0-LS7 is delayed by clocking the segment number through registers 288 and 290. The present segment number is assigned a blob number PB0-PB9 received from the blob ancestor linking circuitry. The blob number is provided through register 292 to the data inputs of memories 282, 284 and 286.

If the present segment is matched in color to a segment on the preceeding line, then the blob number of the segment matched on the preceeding line is assigned to the present segment. If the segment is not matched, then a new blob number is assigned to the present segment.

Readout of the segment numbers from the previous line as stored in the pixel segment memory is accomplished by using the pixel address 1HADR0-1HADR8 in addition to the signal A/B from flip-flop 279. The address 1HADR0-1HADR8 and the signal A/B is provided through register 294 to the address inputs of memories 274, 276 and 278. The use of the address 1HADR0-1HADR8 and the signal A/B aligns the information read out of the memories before is required by the downward connectivity circuitry. The line segment number corresponding to the pixel address is read out of memories 274, 276 and 278 and provided to register 296. The line segment number stored in register 296 is then provided to memories 282, 284 and 286. This line segment number is used to address the blob number assigned on the previous line to that segment. The blob number is provided from memories 282, 284 and 286 to register 298 for sending to the downward connectivity circuitry as the blob number BN0-BN9.

A delay line 300 generates timing output signals through logic gates 302 and 304 which are coupled through additional logic gates 306, 308 and 310 to memories 274, 276 and 278. In addition, the output of gates 302 and 304 are couped through gates 312, 314 and 316 along with a signal from flip-flop 318 to memories 282, 284 and 286. The signals provided from delay line 300 are timing signals that are utilized as chip enable and write enable signals required by the memories. Control of the pixel/segment memories is via the logic gates 310 and 308 which always write and read the pixel/memory every clock cycle.

Pixel/segment memories 274, 276 and 278 are ping-ponged between two memory sections every line by the signal A/B. As a result, one section of the memory is used to read out the segment number of the pixels on the previous line. The second section of the memory is used to write the present line segment. The ping-ponging of the pixel/segment memory is generated by the flip-flop 279 which generates the signal A/B and A/B from the horizontal signal XHPV4. The memories are two-phased between the memory sections by the clock signal MC1. When the clock signal MC1 is high, the present line information is written into the pixel/segment memory. When the clock signal MC1 is low, the previous line information is read out of the memory.

The signal P22 provided to memory 278 through flip-flop 320 is provided from the downward connectivity circuitry. The signal P22 is pixel data delayed by one additional horizontal line. The signal P22 provides a third line of pixel data required in the generation of the three by three kernel of pixel data for object edge determination. The third line of pixel data read out of memory 278 is provided through registers 322 and 324 as the signal PLO.

Control of the segment/blob memory is by the signals from the output of gates 312 and 316. Blob numbers are read from the segment/blob memory each clock cycle. However, blob numbers are only written into the segment/blob memory at the end of the segment as determined by the signal LAST PIXEL from the downward connectivity circuit. The signal LAST PIXEL is provided to gates 312, 314 and 316 through flip-flop 318.

Figure 12B:
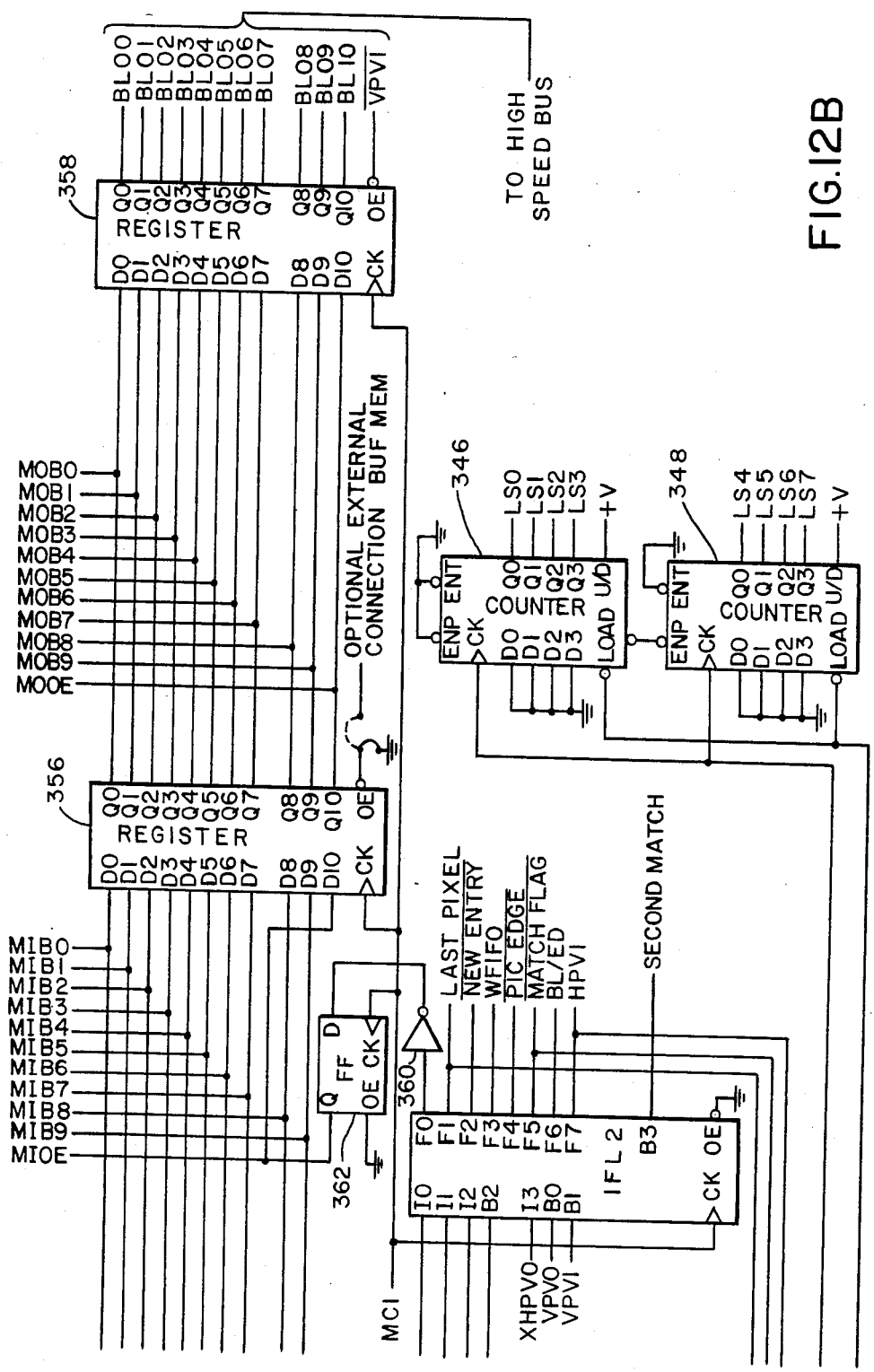

FIGS. 12A and 12B illustrate the downward connectivity circuitry. Downward connectivity forms the video image under inspection, as represented by pixel data, into blobs. The pixels are connected into blobs going downwardly and across from the top of the image. Threshold video pixel data is provided through logic gate 330 through a series of flip-flops 332, 334 and 336 with flip-flops 334 and 336 providing pixel delay. This delay is required to form a three by three pixel kernel used by the downward connectivity circuitry.

As each threshold video pixel is input to the downward connectivity circuitry, the pixel is simultaneously assigned to a segment, a horizontal length of pixels of the same color. To establish the segment numbers, the threshold video data is provided from the output of flip-flop 334 through logic gates 338, 340 and 342 along with a Q output from flip-flop 344. Flip-flop 344, clocked by the signal MC1, as a RESET SEG signal input. The Q output of flip-flop 344 is provided to the clock input to cascaded counters 346 and 348. Counters 346 and 348 generate the line segment number LS0–LS7. The line segment number LS0–LS7 for each pixel is sent to the pixel/segment memory. The segment number address the segment/blob memory for storing blob number at the implied horizontal pixel location, for readout during the next horizontal line. The RESET SEG signal clocked through flip-flop 344 has a Q output is coupled to a load input of counters 346 and 348. This Q signal resets the counters to zero at the end of a horizontal line of pixel data.

The blob numbers provided from the segment/blob memories are provided to the downward connectivity circuitry, and especially to the integrated fuse logic IFL1 directly and through registers 350 and 352. The programming chart for IFL1 is illustrated in Table 1. IFL1 looks at a three by three kernel of pixel data consisting of the present line and the two previous lines. IFL1 also determines if there is a match between the pixel on the present line and the pixel on the preceeding line. A match is defined as a pixel on the present line having the same color as the pixel directly above on the preceeding line.

If IFL1 determines there is a match, the segment on the present line is assigned the blob number of the segment on the preceeding line. If there are no matches between the pixels of the segment on the present line and the pixels of the preceeding line, the segment on the present line starts a new blob. The new blob is assigned the next unassigned blob number from the blob number generator. If there are matches between a present line segment pixels and the pixels are matched to two or more segments on the preceeding line, the present line segment is assigned the blob number of the first segment on the preceeding line. The blob number assigned to the second segment of the previous line, in which pixels of the present line match, is sent with the blob number assigned to the present line segment number as a blob link pair to the blob link pair first-in-first-out (FIFO) memory.

The blob number impliedly assigned to each pixel on the preceeding line is read from the segment/blob memory as blob number BN0–BN9. A further line is stored as a one-bit signal PLO resulting from a line prior to previous line and was the most significant bit of a blob number and identifies the color of the pixel. The signal PLO provides the final line for the three by three pixel kernel. IFL1 operates on the three by three kernel and generates the following signal. An XOBJECT EDGE signal is generated at the B0 output when the pixel is on the edge of an object. An XMATCH SIGNAL is generated at the B1 output when the pixel in the present line is the same color as the pixel on the preceeding line, i.e. a match. If one or more contiguous pixel matches occur, only the first matched pixel is asserted. An XLAST PIXEL signal is generated at the B2 output when the pixel is the last pixel of a segment. An XFIRST PIXEL signal is generated at the B8 output when the pixel on the present line is the first pixel of a segment. A STORE MATCH signal is provided at the B3 output of IFL1 when a pixel match occurs.

IFL2 latches the XOBJECT EDGE, XMATCH, XLAST PIXEL and XFIRST PIXEL generated by PAL1 and provides additional combination of logic. The programming chart for IFL2 is illustrated in Table 2. The latching of signals by IFL2 justifies the input signals to the rising edge of the clock signal MC1. As a result the OBJECT EDGE signal is generated or asserted when the pixel is on the edge of an object and is provided at the F0 output of IFL2 as edge flag. The LAST PIXEL signal is generated or asserted when the pixel is the last pixel of a line segment. The NEW ENTRY signal is generated or asserted when (1) a segment is assigned a new blob number, (2) a segment touches the edge of the picture or (3) a blob-link pair is generated. The signal WFIFO is generated when there is a match on the line segment on the present line with a second segment on the preceeding line. a blob-link pair is then sent and stored into the blob-link pair FIFO under the control of the WFIFO signal. The blob-link pair stored in the FIFO consists of the blob number assigned the segment on the present line and the blob number of the segment matched on the preceeding line.

IFL2 provides a PIC EDGE signal when the segment is on the physical edge of the picture, i.e. top, bottom, left or right edges of the picture. IFL2 generates a MATCH FLAG signal when the pixels of the present line segment are matched to the pixels of a preceeding line segment. A BL/ED signal is generated by IFL2 when a new blob is to stored, regardless of whether the line segment is touching the edge or not. The BL/ED signal is negated when the segment is touching the edge, but has not been assigned an existing blob number. The BL/ED signal is used to keep track of the blobs and later, the objects which are touching the edge of the picture. The signal HPV1 is a one pixel clock cycle delay of the signal XHPV0 for use in timing of the image. The blob numbers clock through registers 350 and 352 are further clocked through registers 354, 356, and 358. The output of register 358, BL00-BL10, are the blob numbers which are provided to the high-speed bus for utilization in other portions of the system.

A blob buffer memory may be utilized in the system, as an option, to hold the blob numbers for one field of the picture to obtain full high speed operation. The buffer memory is provided through an external BUF MEM signal to enable or disable register 356. The output of register 354 is provided to the optional buffer memory as signals MIB0-MIB9 and return from the buffer memory as inputs to register 358 as a signal MOB0-MOB9. The OBJECT EDGE signal from the F0 output of IFL2 and is provided through inverter 360 to flip-flop 362. The output of flip-flop 362 is provided as the signal MOIE which is also stored in blob buffer memory and provided to register 358 as the signal MOOE.

Figure 13A:
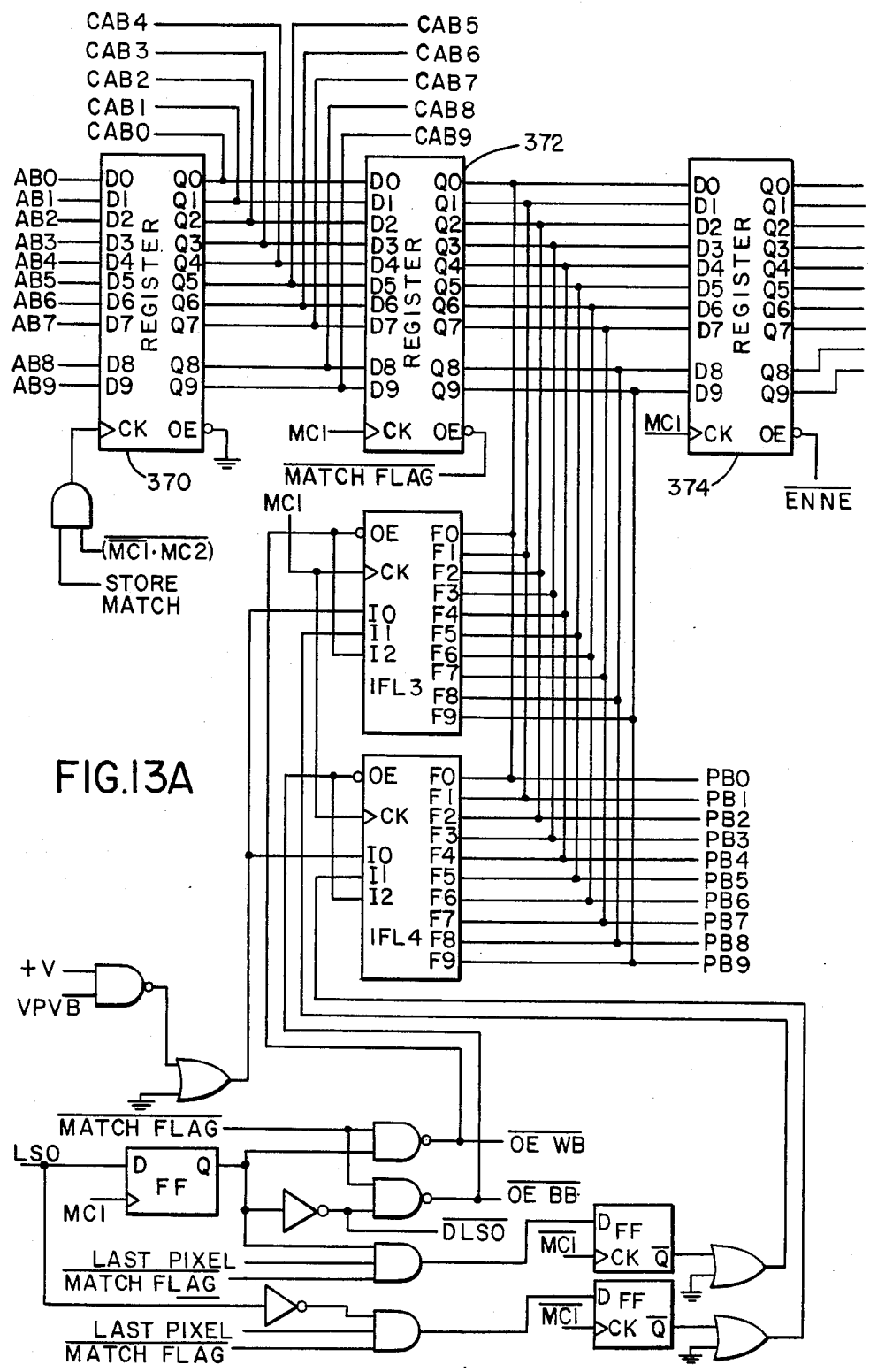
FIGS. 13a and 13b is a schematical diagram of the blob ancestor linking circuitry.
Figure 13B:
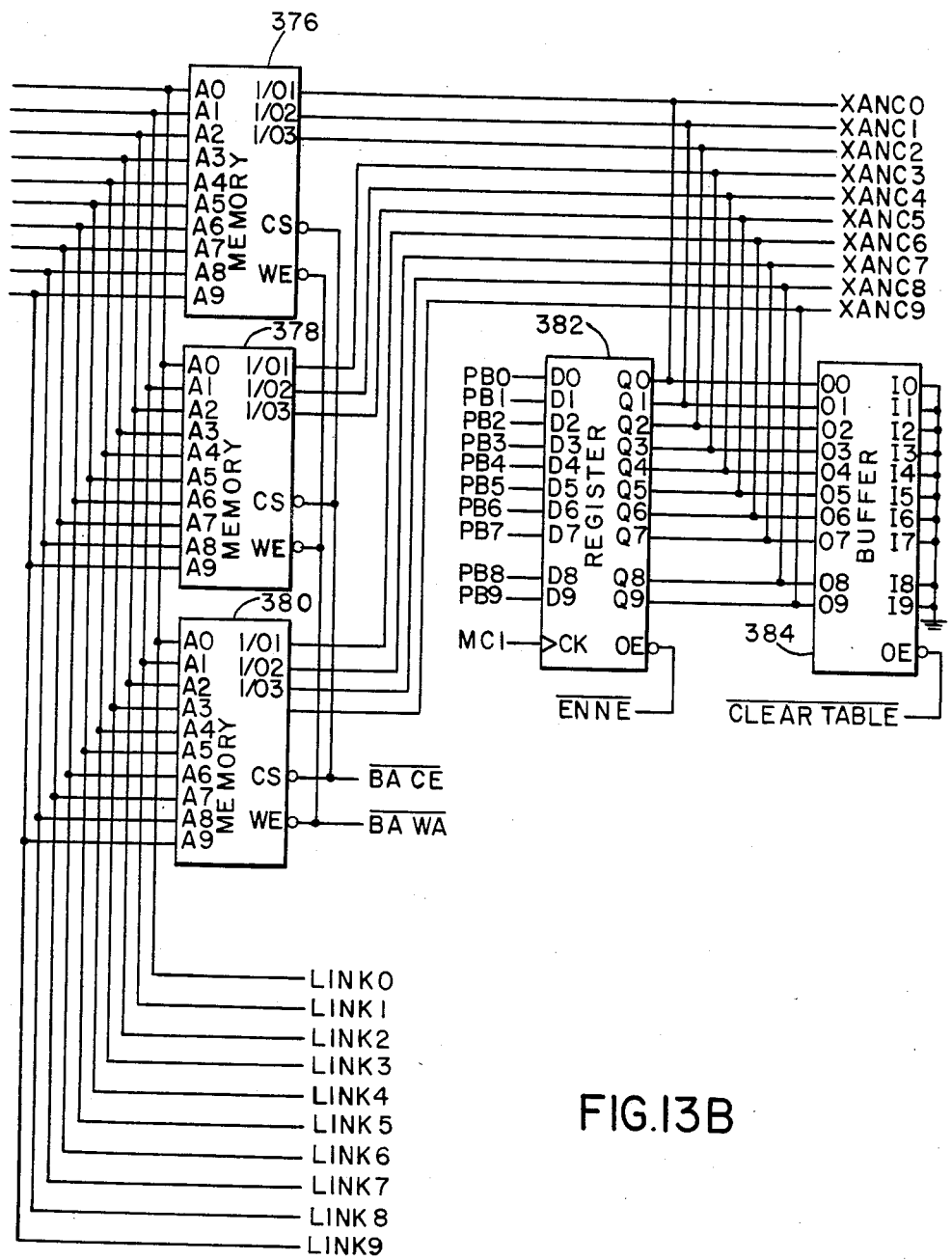

FIGS. 13A and 13B illustrate the blob number generator circuitry for assigning new blob numbers and the memory circuitry for storing ancestor blobs required for upward connectivity blob-linking.

New blob numbers are generated by IFL3 and IFL4 and provided as the outputs PB0-PB9. White blobs are generated in IFL3 while black blobs are generated by IFL4. The programming charts of IFL3 and IFL4 are respectively illustrated in Table 3 and Table 4. White blob numbers generated have the most significant bit of the ten-bit blob number as a logical "1" while the most significant bit of the black blob numbers is a logical "0". When a segment is not matched, the segment is assigned the next unassigned blob number from either IFL3 or IFL4. The IFL from which the blob number is obtained is then incremented to the next unassigned blob number. A total of 1024 blobs, 512 black and 512 white are respectively gnerated by IFL4 and IFL3. The new blob numbers are sent to the segment/blob memory as the blob number PB0-PB9.

The blob number corresponding to the pixels on the preceeding line is received in the blob ancestor linking circuitry as the blob number AB0-AB9. If the downward connectivity circuitry finds a match between the pixels in the previous line with the pixels in the present line, the blob number of the pixels on the previous line, AB0-AB9, is temporarily stored in register 370. At the end of the segment, the blob number temporarily stored in register 370 is clocked through registers 372 and 374 as an address to the blob ancestor memory comprised of memories 376, 378 and 380. In addition, the matched blob number is sent through registers 372 and 382 to the data I/O ports of memories 376, 378 and 380. The matched blob number PB0-BP9 is stored in the segment/blob memory as the blob number assigned to the present segment.

When a new blob is generated, the blob number PB0-PB9 addresses memories 376, 378 and 380 through register 374. The blob number PB0-PB9 is provided through register 382 to the data I/O ports of memories 376, 378 and 380. The blob number is stored in memories 376, 378 and 380 at memory location addressed by the same blob number. Therefore, when a new blob number is assigned, it is assigned itself as its own ancestor. When a blob is connected by the upward connectivity circuitry to other blobs so as to form an object, the lowest number blob in the object becomes the common ancestor of all blobs in the object.

The connections to a blob linking portion of the upward connectivity circuitry are the blob numbers used as the address LINK0-LINK9 and the data XANC-0-XANC9. When blob informationis set into objects and transferred to the blob/object memory, all the information in the blob ancestor memory is cleared by writing 0's into all the blob ancestor memory locations. This memory clearing action prepares the blob ancestor memory for the next field of video. The clearing of the blob ancestor memory is accomplished by buffer 384 which places 0's on the data I/O lines of memories 376, 378 and 380. This action is under the control of the blob linking circuitry portion which provides a CLEAR TABLE signal to buffer 384.

Figure 14A:
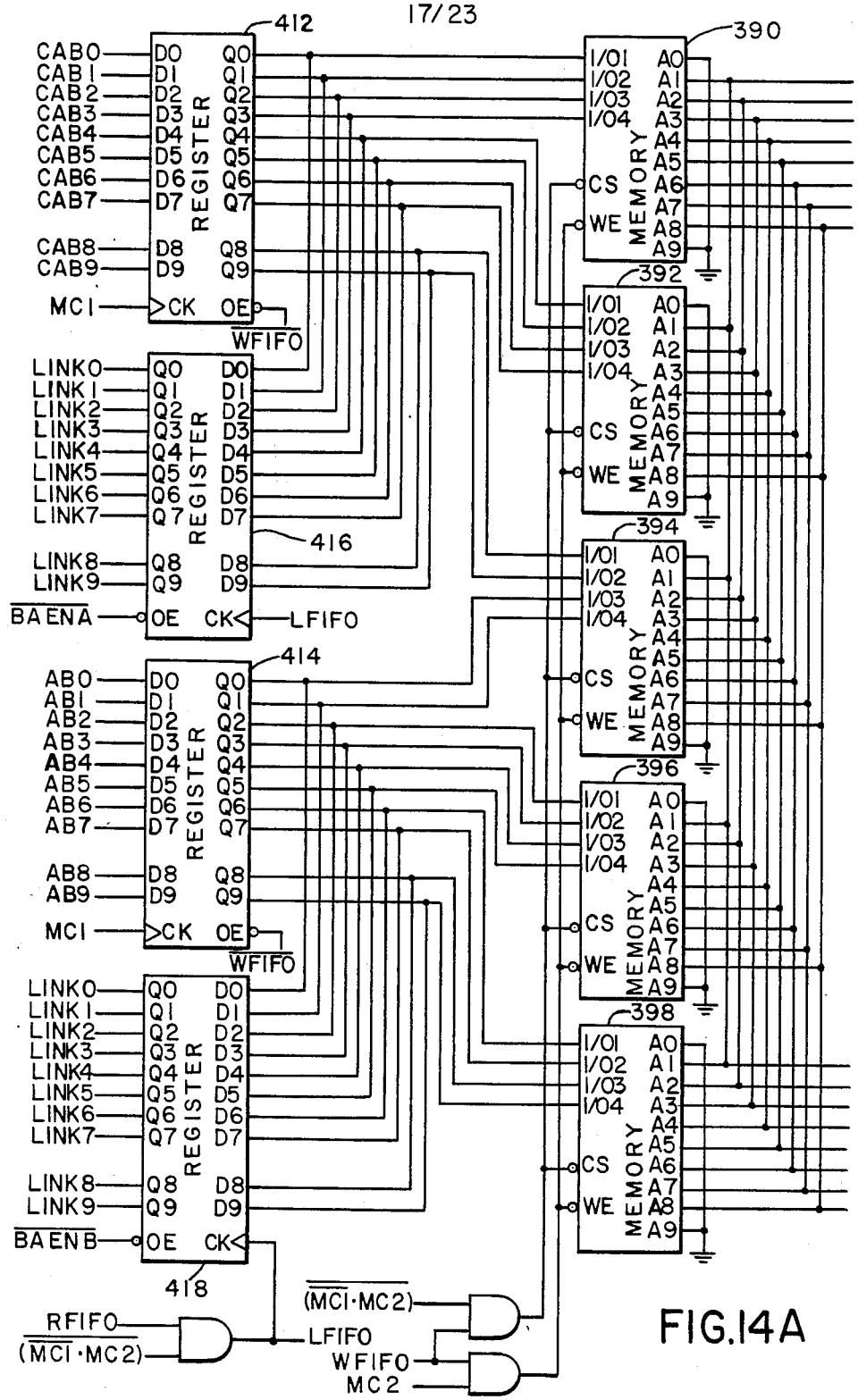
FIGS. 14a and 14b is a schematical diagram of the blob linking FIFO memory circuitry.
Figure 14B:
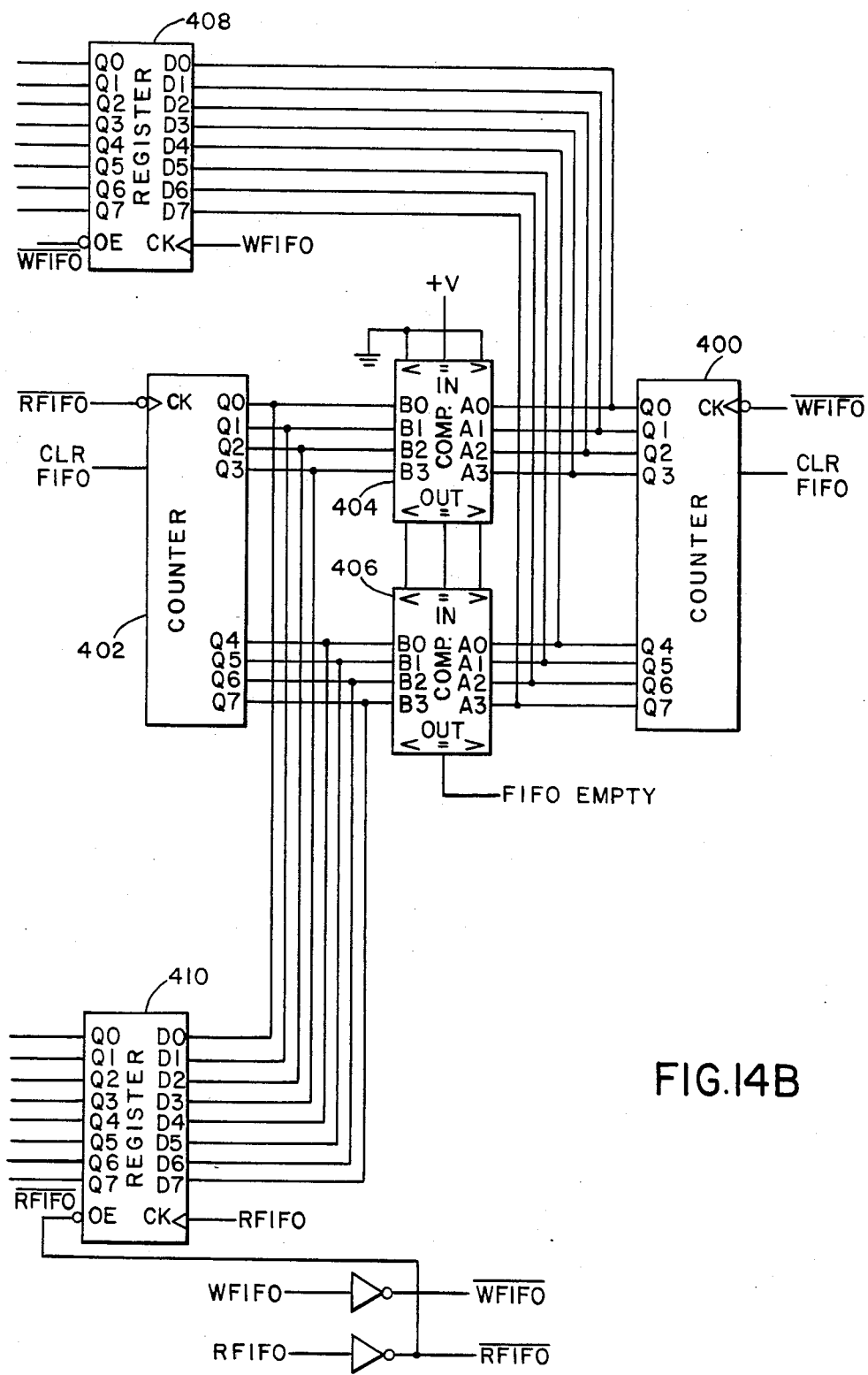

FIGS. 14A and 14B illustrate the blob link pair FIFO memory circuitry. This circuitry stores the blob link pairs generated by the downward connectivity circuitry until the upward connectivity circuitry analyzes the blob link pairs. The blob link pairs are stored in the FIFO memory comprised of memories 390, 392, 394, 396 and 398. The FIFO memory is addressed by counters 400 and 402 used to respectively provide a write and read address to the memories 390-398. Cascaded comparators 404 and 406 compare the address provided by counters 400 and 402 to determine if the addresses are equal or different. The addresses provided from write counter 400 are provided through register 408 to memories 390-398. The read address is provided from read counter 402 is provided to through register 410 to memories 390-398.

At the start of a field of video, counters 400 and 402 are reset to provide a 0 address output. Comparators 404 and 406 compare the addresses and made a determination that they are equal by providing a high FIFO EMPTY signal. In this case there are no blob link pairs in the FIFO memory. When a blob link pair is generated, the blob link pair blob numbers are written into the memory location determined by the write counter. The write counter is then incremented. With the write counter address no longer equal to the read counter address, the FIFO EMPTY signal, normally high, goes low. The upward connectivity circuitry in response to the low FIFO EMPTY signal requests the blob link pair from the FIFO memory. The FIFO memory outputs the information from the location determined by the read counter address. The read counter is then incremented. Since the read and write addresses are now the same, the FIFO EMPTY signal goes high again.

In the implementation illustrated in FIG. 14, up to 256 blob link pairs can be held in the FIFO memory waiting for their use by the upward connectivity circuitry. The blob link pairs come to the FIFO memory from the downward connectivity circuitry as the blob numbers CAB0-CAB9 and AB0-AB9, respectively provided through registers 412 and 414. The blob link pair are output from the FIFO memory are provided through registers 416 and 418 to the upward connectivity circuitry as the blob numbers LINK0–LINK9. A single LINK0–LINK9 blob number nomenclature is used in this case since the two blobs numbers in the blob link pair are analyzed at different times using the same circuitry.

FIGS. 15 and 16 illustrates the blob linking control circuitry which handles the state machine work for upward connectivity. IFL5 and register 430 respectively control the state machine and later described in more detail. IFL5 receives input signals directly and indirectly, through logic gates 432, 434, 436 and flip-flop 438, in addition to feedback from register 430. IFL5 determines the transitions for state machine operation, while register 430 provides the storage of the states. The programming chart for IFL5 is illustrated in Table 5.

The proper operation required for each state of the state machine is determined by IFL6 and IFL7. IFL6 and IFL7 provide, either directly or through a series of logic gates 440–450, control signals to the blob linking comparison circuitry and the blob ancestor memory. It should be noted that the use of the NEW ENTRY signal is used to skip and hold the operation of the state machine when a new blob link is being entered into the FIFO memory or when a new blob number is assigned. This skip and hold operation does not affect the state machine operation other than the skipping of a clock cycle of operation.

FIG. 16 illustrates circuitry utilized in the transfer of blob ancestor information to the blob ancestor memory. In the transfer of blob information from the blob ancestor memory to the blob object memory all the available blob numbers are generated, i.e. 0–1023. The blob numbers are generated by cascaded counters 452, 454 and 456. The blob numbers generated by counters 452, 454 and 456 are provided through register 458 as the address LINK0–LINK9 in the blob ancestor memory. In addition, the counters upon reaching the total blob count of 1024 blobs provides a control signal BL=1023. This signal is provided through logic gate 460 from selected outputs of counters 454 and 456 to indicate that all available blob numbers have been generated.

Figure 17:
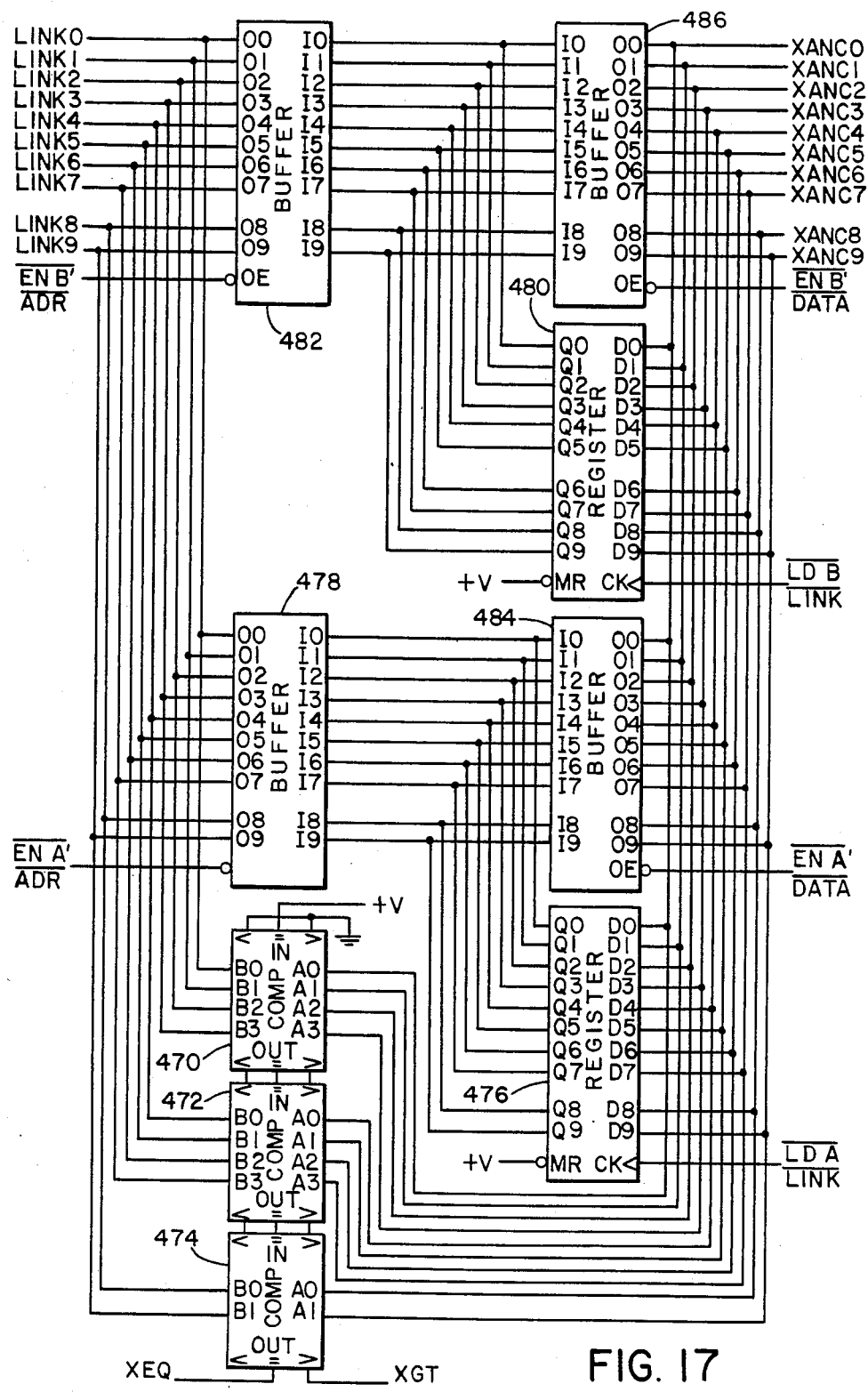
FIG. 17 is a schematical diagram of the blob linking comparison circuitry.

FIG. 17 illustrates the blob linking comparison circuitry. This circuitry holds the information during the upward connectivity in blob linking and performs the comparison of the resulting ultimate ancestors. Cascaded comparators 470, 472 and 474 determine which of the ultimate ancestors of the blob link pair is the smallest blob number. Both of the blob numbers in the blob link pair are then assigned the same lower numbered ultimate ancestor. The two blobs in the blob link pair may be labeled Blob A and Blob B. Each blob is read from the FIFO memory with their ancestors read from the blob ancestor memory. From these ancestors the ultimate ancestor is then determined. Blob A is stored in register 476 and is sent through buffer 478 to the blob ancestor memory as the address LINK0–LINK9 to find the ancestor of Blob A. The blob number addressed in the blob ancestor memory is provided on the lines XANC0–XANC9 to register 476. The ancestor provided on lines XANC0–XANC9 and the address on LINK0–LINK9 are compared by compartors 470, 472 and 474. If the numbers are the same, the blob number is determined to be an ultimate ancestor and an XEQ signal output is provided from comparator 474. If they are not equal the ancestor XANC0-9 is stored in register 476 and the process is repeated for the ancestor of Blob A until the ultimate ancestor of Blob A is found.

Next blob B is processed in a manner similar to processing of Blob A. Blob B is stored in register 480. The blob number of Blob B is sent through buffer 482 as the address LINK0–LINK9 to the blob ancestor memory. The data read out of the blob ancestor memory is provided on lines XANC0–XANC9 to register 480 where it is stored. The data on lines XANC0–XANC9 is compared with the address on LINK0–LINK9 to determine if the ultimate ancestor for Blob B has been found. This process is reported if necessary to determine the ultimate ancestor of Blob B.

The ultimate ancestor of Blob A is stored in register 476 and the ultimate ancestor of Blob B is stored in register 480. The ultimate ancestor of Blob A and Blob B are then respectively provided through buffers 484 and 482 to comparators 470, 472 and 474. The lowest numbered ultimate ancestor is assigned as the new ultimate ancestor of the higher numbered ultimate ancestor. The common ultimate ancestor of the blob link pair Blobs A and B is stored in the blob ancestor memory either through buffer 484 or buffer 486.

Figure 18:
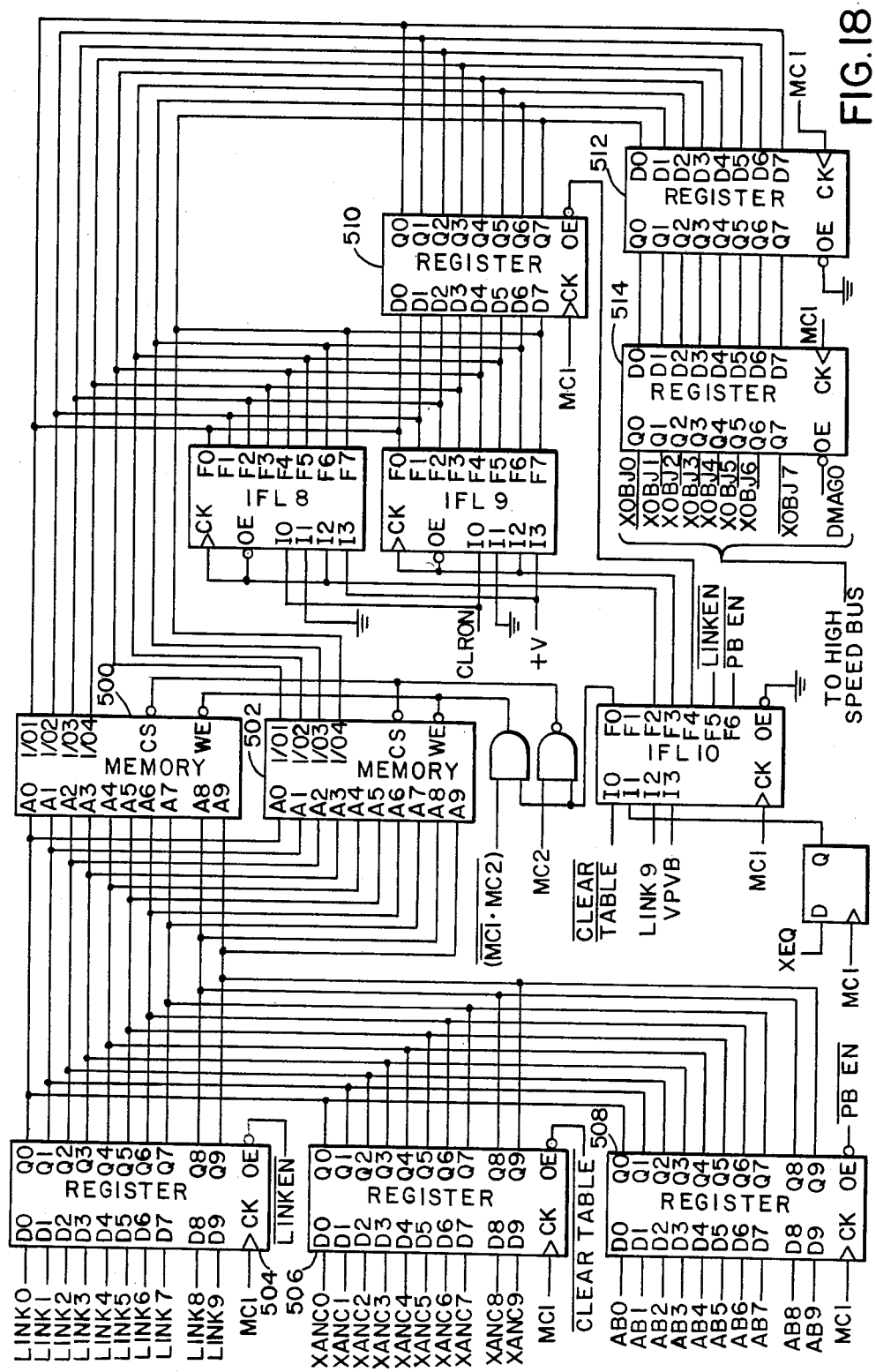
FIG. 18 is a schematical diagram of the object number generators and blob/object memory.

FIG. 18 illustrates the blob/object memory circuitry. The blob/object memory is comprised of memories 500 and 502. Memories 500 and 502 are addressed by the blob number provided as the address LINK0–LINK9 through register 504 when assigned an object number of a blob or as the address XANC0–XANC9 register 506 when finding what object has been assigned to the ancestor of the blob presently being assigned an object. In addition, the memories 500 and 502 are addressed by the blob number AB0–AB9 through register 508 when the full picture is sent through the blob/object memory to determine what object number is to be sent on the high-speed bus for a pixel.

The signal XEQ generated by the blob linking comparison circuitry is provided into IFL10. IFL10 provides control signals to IFL8 and IFL9 which respectively generate the eight bit object numbers for black and white blobs. The programming charts for IFL8, IFL9 and IFL10 are respectively illustrated in Table 8, Table 9 and Table 10. The output of IFL8 and IFL9 are stored in memories 500 and 502 to be used in the next field to assign object numbers to the blob. During the second field of video the blob/object memory is addressed by the blob numbers AB0–AB9 through register 508. Object numbers are then output from the blob/object and are provided to the high speed bus through registers 512 and 514.

Figure 19:
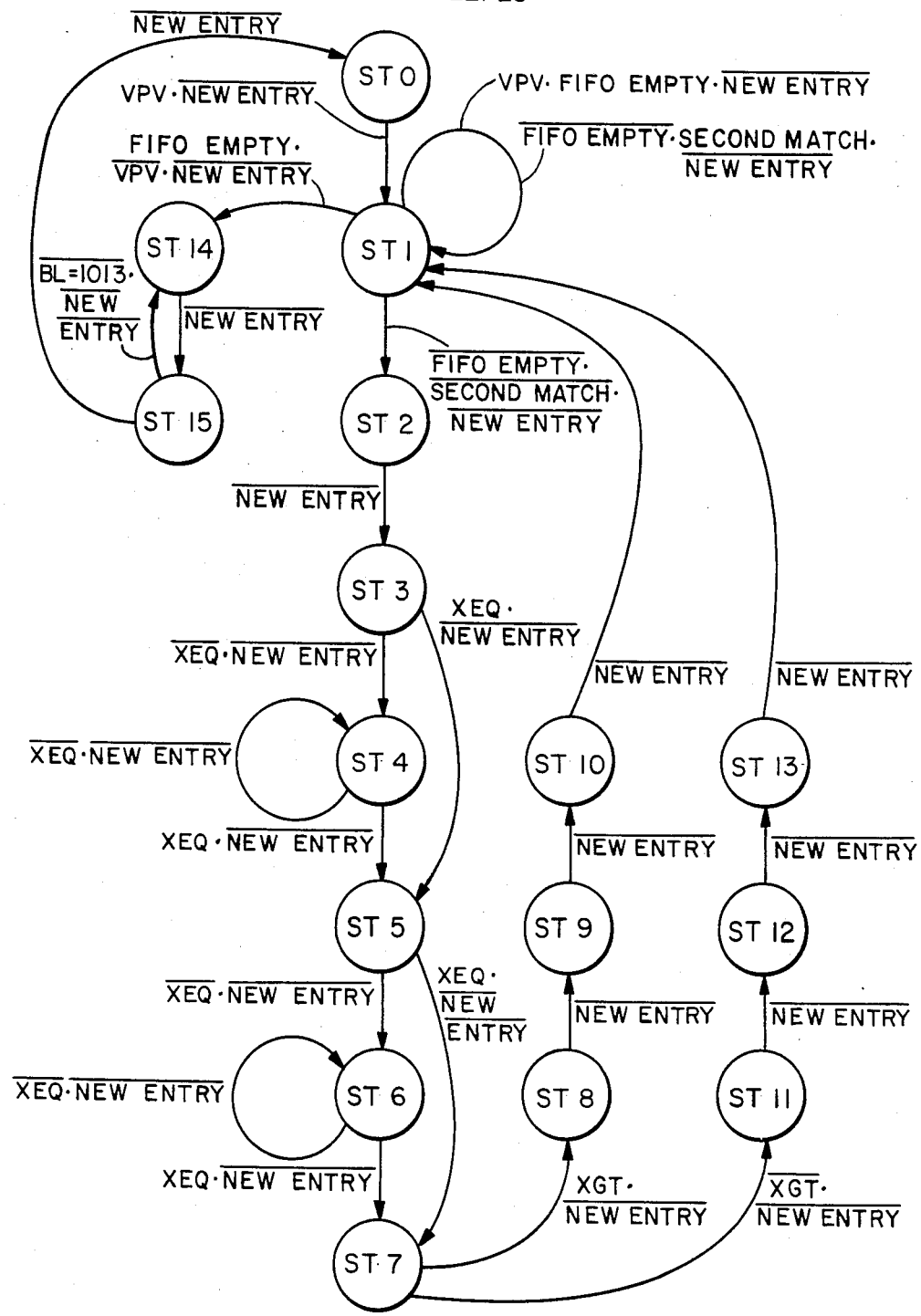
FIG. 19 is a state machine state diagram.

The blob linking state machine of the blob linking control circuitry consists of IFL5, IFL6 and IFL7 along with associated circuitry forms the upper connectivity of forming the blob generated by the downward connectivity into object. FIGS. 19 and 20 respectively illustrate the state transitions for the blob-linking state machine and actions per state.

The transitions from one state to another are determined by IFL5. These transitions are determined by the programming of the programmable array logic device according to the programming chart of Table 5. Each state is determined by the number SA, SB, SC and SD which are numbers corresponding to the present state. The next state, after the next rising edge of the clock MC1, is determined by the numbers SA+1, SB+1, SC+1, SD+1. If a new entry to the blob/ancestor table is required, the signal NEW ENTRY is asserted low and the machine does not go to the next state. In this condition the machine loops upon the same state until the signal NEW ENTRY is negated high.

For each state, the actions required are determined by IFL6 and IFL7 whose programming charts are respectively illustrated in Table 6 and Table 7. The actions for each state are shown in the blob linking state machine actions per state chart illustrated in FIG. 20. The entries are for States 0–15 and the two special states when the NEW ENTRY signal is asserted low.

The blob linking state machines takes the blob link pairs from the FIFO memory and finds the ultimate ancestor of each blob in the blob link pair. The ultimate ancestor is defined as the blob that has itself as its own ancestor. The circuitry then reassigns the higher numbered ultimate ancestor as its ancestor the blob number of the lowered number ultimate ancestor. In effect, the higher ultimate ancestor is no longer an ultimate ancestor since it is no longer its own ancestor. This action completes the required mathematical formation of objects with each blob in an object having the same ultimate ancestor which is the lowest numbered blob in the object.

A speed-up technique is utilized to reduce the traveling over paths more than once in the determination of ultimate ancestors. The two original blobs of the blob link pair are assigned, as an ancestor, the new ultimate ancestor found. This effectively reduces the duplication in efforts in finding the ultimate ancestors.

The ultimate ancestor will, in general, not be in sequence. Since for convenience in calculation, the object should be sequential. New object numbers are generated for the ultimate ancestor of blobs only.

The blobs and their ancestors sent to the blob/ancestor memory are analyzed in sequence from blob number 0 to blob number 1023. The ancestor of each blob is read from the blob ancestor memory and when the ancestor is same as the blob, the blob is the first blob of the new object. Accordingly a new object number is assigned to the blob and stored in the blob/object memory. If the ancestor of the blob is not the same as the blob, the object that has already been assigned to the ancestor is read from the blob/object memory. This previously generated object number is assigned to the blob in the blob/object memory. In this process, all blobs in the image are assigned to objects which are stored within the blob/object memory. Using the blob numbers to address the blob/object memory, the object numbers are read out and sent to the rest of the system.

With reference again to FIG. 19 the state machine state diagram is described as follows. The system is initially in State 0 upon power-up of the system or by default. The state machine waits in State 0 until a command is received to start the picture. The machine goes to State 1 upon the occurrence of the signal (VPV.NEW ENTRY) which indicates the beginning of a new field of video.

Upon arriving at State 1, the state machine waits in State 1 which is the wait state when the picture is valid. The state machine loops on State 1 while still in the field but there are no blob link pairs in the FIFO memory, indicated by the signal (VPV.FIFO EMPTY.NEW ENTRY). The state machine will also loop on State 1 if there are blob link pairs in the FIFO memory but the downward connectivity circuitry is using the FIFO memory. In this condition the state machine must wait and the condition is indicated by the signal (FIFO EMPTY.SECOND MATCH.NEW ENTRY). If there are blob link pairs in the FIFO memory and it is free to use, the state machine goes to State 2. However, if the end of the field occurs and all blob link pairs in the FIFO memory are processed, the state machine goes from State 1 to State 14.

In State 2 the state machine reads the next blob link pair (Blobs A & B) from the FIFO memory and goes to State 3. The transition to State 3 occurs upon the signal (NEW ENTRY).

In State 3, the ancestor of Blob A (A) is compared to Blob A. The ancestor (A) is stored as ancestor (A'). If the ancestor (A') is not equal to Blob A (A), the ancestor (A) is not the ultimate ancestor of Blob A and the state machine goes to State 4. However, if ancestor (A) equals Blob A, ancestor (A) is the ultimate ancestor of Blob A and the state machine goes to State 5. The transition to State 4 from State 3 is indicated by the signal ($\overline{\text{XEQ}}$.NEW ENTRY) while the transition to State 5 from State 3 is indicated by the signal (XEQ.NEW ENTRY).

In State 4 the ancestor of the stored blob ancestor (A') is read and compared to the stored blob ancestor A'. The ancestor (A') is stored as ancestor (A"). If upon a comparison of the ancestor (A') and ancestor (A") they are not equal, the state machine remains in State 4 with ancestor (A') not being the ultimate ancestor. If this condition the process is repeated by looping on State 4 as indicated by the signal ($\overline{\text{XEQ}}$.NEW ENTRY). However, if ancestor (A') and ancestor (A") are equal, ancestor (A') is an ultimate ancestor and the state machine goes to State 5.

The transition to State 5 from State 4 is indicated by the signal (XEQ.NEW ENTRY). State 5 and State 6 are identical in operation with respect to States 3 and 4 except that Blob B of the blob link pair is processed. Upon finding the ultimate ancestor from these states the state machine goes from either State 5 or State 6 to State 7.

In State 7 the ultimate ancestor of Blob A is compared with the ancestor of Blob B. If the ultimate ancestor of Blob A has a blob number greater than the blob number of the ultimate ancestor of Blob B, the ultimate ancestor of both Blobs A and B is the ultimate ancestor of Blob B. The state machine goes to State 8 upon this condition as indicated by the signal (XGT.NEW ENTRY).

If, during State 7 the comparison of the ultimate ancestor of Blob A is determined not to have a greater blob number than the ultimate ancestor of Blob B, the ultimate ancestor of Blob A is the ultimate ancestor of both Blobs A and B. The state machine goes to State 11 upon this condition as indicated by the signal ($\overline{\text{XGT}}$.NEW ENTRY).

In State 8 the ultimate ancestor of Blob B is set as the ancestor of the ultimate ancestor of Blob A. This action enables a tree to be formulated with the ultimate ancestor at the top of the tree of blob ancestors. The state machine next goes to State 9 upon the occurrence of the signal (NEW ENTRY).

In State 9 the ultimate ancestor of Blob B, is set as the ancestor of Blob A. This action implements the speed-up technique in determining ultimate ancestors of later blobs. The state machine next goes to State 10 upon the occurrence of the signal (NEW ENTRY).

In State 10, the ancestor of Blob B is set as the ancestor of Blob B now that the ultimate ancestor for both Blobs A and B of the bob link pair have been determined, the state machine next goes to State 1 upon the occurrence of the signal (NEW ENTRY).

Should the state machine have gone from State 7 to State 11 the following occurs. The state machine in State 11 sets the ultimate ancestor of Blob A as the ancestor of the ultimate ancestor of Blob B. This action enables a tree to be formulated with the ultimate ancestor at the top of the tree. The state machine next goes to State 12.

In State 12 the ultimate ancestor of Blob A is set as the ancestor of Blob A. This action implements the speed-up technique in the determination of ultimate ancestors. Next, the state machine goes to State 13 upon the occurrence of the signal (NEW ENTRY).

In State 13 the ultimate ancestor of Blob A is set as the ancestor of Blob B. This also also implements the speed-up technique in the determination of ultimate ancestors. Next, the state machine goes to State 1.

In State 1, after coming from States 10 or 13, the state machine goes to State 14 upon the occurrence of the signal (FIFO EMPTY.$\overline{VPV}$.NEW ENTRY). In State 14 the blob numbers are sequentially generated one by one to access the ancestor blobs. If the blob number of the ancestor of a blob is the same as that blob number, then a new object is formed. If the ancestor blob is not the same as the generated blob number, no new object is formed and the object assigned to the ancestor of the blob is found to determine the object of which it is a part. The state machine next goes to State 15 upon the occurrence of the signal (NEW ENTRY).

In State 15 a new object number is generated, if the blob found in State 14 was an ultimate ancestor. If not the blob is assigned a previously generated object number for the object of which the blob is a part. The blob counter is incremented and if the blob number is less than the total of 1024 blobs, state machine returns to State 14 to process the next blobs upon the signal (BL=1023.NEW ENTRY). If there are no more blobs to be processed in State 14, the state machine returns to State 0 and waits for the next field of video.

TABLE 1

IFL 1

Device: Signetics Part No. 82S153

```
                                              *POL HHHHHHHHHL
*P 00   *I HHHHHHHH  *BI H---------  *BO .........A
*P 01   *I LLLLLLLL  *BI L---------  *BO .........A
*P 02   *I HL------  *BI ----------  *BO ..........
*P 03   *I LH------  *BI ----------  *BO ..........
*P 04   *I H----H-L  *BI ----------  *BO ..........
*P 05   *I H----H--  *BI L---------  *BO ..........
*P 06   *I L----L-H  *BI ----------  *BO ..........
*P 07   *I L----L--  *BI H---------  *BO ..........
*P 08   *I H----H--  *BI --LH------  *BO ........A.
*P 09   *I L----L--  *BI --LH------  *BO ........A.
*P 10   *I --------  *BI -----H--H-  *BO .......A...
*P 11   *I --------  *BI ----H---H-  *BO ..........
*P 12   *I L-------  *BI H---------  *BO ..........
*P 13   *I H-------  *BI L---------  *BO ..........
*P 14   *I --------  *BI --LH------  *BO ..........
*P 15   *I L-------  *BI H---------  *BO ..........
*P 16   *I H-------  *BI L---------  *BO ..........
*P 17   *I --------  *BI --LH------  *BO .A........
*P 18   *I --------  *BI -------HH-  *BO ..........
*P 19   *I HL------  *BI ---H------  *BO ........A..
*P 20   *I LH------  *BI ---H------  *BO .......A..
*P 21   *I --------  *BI --HL------  *BO .......A..
*P 22   *I H----H-L  *BI --H-------  *BO ........A.
*P 23   *I H----H--  *BI L-H-------  *BO ........A.
*P 24   *I L----L-H  *BI --H-------  *BO ........A.
*P 25   *I L----L--  *BI H-H-------  *BO ........A.
*P 26   *I L-------  *BI H-H-------  *BO .A........
*P 27   *I H-------  *BI L-H-------  *BO .A........
*P 28   *I --------  *BI -H------H- *BO .......A...
```

```
*P 29   *I 00000000   *BI 0000000000   *BO AAAAAAAAAA
*P 30   *I 00000000   *BI 0000000000   *BO AAAAAAAAAA
*P 31   *I 00000000   *BI 0000000000   *BO AAAAAAAAAA
*P 32   *I 00000000   *BI 0000000000        ^
*P 33   *I --------   *BI ----------        ^
*P 34   *I 00000000   *BI 0000000000        ^
*P 35   *I 00000000   *BI 0000000000        ^
*P 36   *I 00000000   *BI 0000000000        ^
*P 37   *I 00000000   *BI 0000000000        ^
*P 38   *I --------   *BI ----------        ^
*P 39   *I --------   *BI ----------        ^
*P 40   *I --------   *BI ----------        ^
*P 41   *I --------   *BI ----------        ^
```

TABLE 2

IFL 2

Device: Signetics Part No. 82S159

```
                                           *E ..    *F/F AAAAAAAA    *POL LHHH
*T 00   *C -   *I ---L   *BI ----   *QP --------   *QN ........    *BO ....
*T 01   *C -   *I -H--   *BI ---H   *QP ---H----   *QN .....A..    *BO ....
*T 02   *C -   *I -H--   *BI --H-   *QP ---H----   *QN .....A..    *BO ....
*T 03   *C -   *I L---   *BI --H-   *QP L-------   *QN .....A..    *BO ....
*T 04   *C -   *I -HL-   *BI ---H   *QP --L-----   *QN .A...A..    *BO ....
*T 05   *C -   *I -HL-   *BI -H-H   *QP --------   *QN .A...A..    *BO ....
*T 06   *C -   *I L---   *BI ----   *QP --------   *QN A.......    *BO ....
*T 07   *C -   *I ----   *BI ----   *QP --H---H-   *QN ..A.....    *BO ....
*T 08   *C -   *I --H-   *BI --HH   *QP --------   *QN ..A.....    *BO ....
*T 09   *C -   *I HL--   *BI ----   *QP --------   *QN .......A.   *BO ....
*T 10   *C -   *I -L--   *BI ----   *QP H-------   *QN .......A.   *BO ....
*T 11   *C -   *I --L-   *BI ----   *QP --------   *QN ....A...    *BO A...
*T 12   *C -   *I ----   *BI ----   *QP --L-----   *QN ....A...    *BO A...
*T 13   *C -   *I ----   *BI -H--   *QP --------   *QN ....A...    *BO A...
*T 14   *C -   *I -HL-   *BI --H-   *QP --L-----   *QN .A...A..    *BO ....
*T 15   *C -   *I -HL-   *BI -HH-   *QP --------   *QN .A...A..    *BO ....
*T 16   *C -   *I ----   *BI --LH   *QP L-------   *QN ........A   *BO ....
*T 17   *C -   *I ----   *BI --HL   *QP L-------   *QN ........A   *BO ....
*T 18   *C -   *I H---   *BI ---H   *QP H-------   *QN ........A   *BO ....
*T 19   *C -   *I L---   *BI ---H   *QP L-------   *QN ........A   *BO ....
*T 20   *C -   *I ----   *BI --LH   *QP --------   *QN ..A.....    *BO ....
*T 21   *C -   *I ----   *BI --HL   *QP --------   *QN ...A....    *BO ....
*T 22   *C -   *I H--H   *BI ---H   *QP --------   *QN ........A   *BO ....
*T 23   *C -   *I L---   *BI ----   *QP --------   *QN ...A....    *BO ....
*T 24   *C -   *I H--L   *BI ---H   *QP --------   *QN ........    *BO ....
*T 25   *C -   *I H---   *BI --LH   *QP --------   *QN ........A   *BO ....
*T 26   *C -   *I ----   *BI --LH   *QP H-------   *QN ........    *BO ....
*T 27   *C -   *I H---   *BI --HL   *QP --------   *QN ........A   *BO ....
*T 28   *C -   *I ----   *BI --HL   *QP H-------   *QN ........    *BO ....
*T 29   *C -   *I H---   *BI ---H   *QP L-------   *QN ........    *BO ....
*T 30   *C -   *I L---   *BI ---H   *QP H-------   *QN ........    *BO ....
*T 31   *C -   *I -L--   *BI ----   *QP ---H----   *QN ...A....    *BO ....
*T FC   *C 0   *I 0000   *BI 0000   *QP 00000000                    
*T PB   *C .   *I 0000   *BI 0000   *QP 00000000                    
*T RB   *C .   *I 0000   *BI 0000   *QP 00000000                    
*T LB   *C .   *I 0000   *BI 0000   *QP 00000000                    
```

```
*T PA  *C .  *I 0000  *BI 0000  *QP 00000000                        ^^^^
*T RA  *C .  *I 0000  *BI 0000  *QP 00000000                        ^^^^
*T LA  *C .  *I 0000  *BI 0000  *QP 00000000                        ^^^^
*T D3  *C -  *I ----  *BI ----  *QP --------                           ^
*T D2  *C .  *I 0000  *BI 0000  *QP 00000000                           ^
*T D1  *C .  *I 0000  *BI 0000  *QP 00000000                           ^
*T D0  *C .  *I 0000  *BI 0000  *QP 00000000                           ^
*T 32  *C -  *I LLLL  *BI LLLL  *QP HHHHHHHH  *QN --------  *BO ....
*T 50  *C -  *I HHHH  *BI HHHH  *QP LLLLLLLL  *QN --------  *BO ....
             3210     3210      76543210      76543210      3210
```

TABLE 3

IFL 3

Device: Signetics Part No. 82S159

```
                                              *E AA       *F/F AAAAAAAA  *POL HHHH
*T 00  *C -  *I --H-  *BI ----  *QP --------  *QN ........O  *BO ....
*T 01  *C -  *I --H-  *BI ----  *QP -------L  *QN .......O.  *BO ....
*T 02  *C -  *I --H-  *BI ----  *QP ------LL  *QN ......O..  *BO ....
*T 03  *C -  *I --H-  *BI ----  *QP -----LLL  *QN .....O...  *BO ....
*T 04  *C -  *I --H-  *BI ----  *QP ----LLLL  *QN ....O....  *BO ....
*T 05  *C -  *I --H-  *BI ----  *QP ---LLLLL  *QN ...O.....  *BO ....
*T 06  *C -  *I --H-  *BI ----  *QP --LLLLLL  *QN ..O......  *BO ....
*T 07  *C -  *I --H-  *BI ----  *QP -LLLLLLO  *QN .O.......  *BO ....
*T 08  *C -  *I ---L  *BI H---  *QP HHHHHHHH  *QN ........  *BO ....
*T 09  *C -  *I ---L  *BI ---H  *QP --------  *QN ........  *BO ....
*T 10  *C -  *I H---  *BI ----  *QP --------  *QN ........  *BO ...A
*T 11  *C -  *I ---L  *BI H--H  *QP LLLLLLLL  *QN ........  *BO ....
*T 12  *C -  *I ---L  *BI -H--  *QP --------  *QN ........  *BO ....
*T 13  *C -  *I ---L  *BI ----  *QP ------L-  *QN ........  *BO ....
*T 14  *C -  *I ---L  *BI H---  *QP --------  *QN ........  *BO ....
*T 15  *C -  *I ----  *BI -H--  *QP --------  *QN ........  *BO A...
*T 16  *C -  *I ---L  *BI H---  *QP HHHHHHHH  *QN ........  *BO ...A
*T 17  *C -  *I ---L  *BI ---H  *QP --------  *QN ........  *BO .A..
*T 18  *C -  *I ---L  *BI -H--  *QP --------  *QN ........  *BO ....
*T 19  *C 0  *I 0000  *BI 0000  *QP 00000000  *QN ........  *BO .A..
*T 20  *C 0  *I 0000  *BI 0000  *QP 00000000  *QN 00000000  *BO AAAA
*T 21  *C 0  *I 0000  *BI 0000  *QP 00000000  *QN 00000000  *BO AAAA
*T 22  *C 0  *I 0000  *BI 0000  *QP 00000000  *QN 00000000  *BO AAAA
*T 23  *C 0  *I 0000  *BI 0000  *QP 00000000  *QN 00000000  *BO AAAA
*T 24  *C 0  *I 0000  *BI 0000  *QP 00000000  *QN 00000000  *BO AAAA
*T 25  *C 0  *I 0000  *BI 0000  *QP 00000000  *QN 00000000  *BO AAAA
*T 26  *C 0  *I 0000  *BI 0000  *QP 00000000  *QN 00000000  *BO AAAA
*T 27  *C 0  *I 0000  *BI 0000  *QP 00000000  *QN 00000000  *BO AAAA
*T 28  *C 0  *I 0000  *BI 0000  *QP 00000000  *QN 00000000  *BO AAAA
*T 29  *C 0  *I 0000  *BI 0000  *QP 00000000  *QN 00000000  *BO AAAA
*T 30  *C -  *I ---L  *BI ----  *QP LLLLLLLL  *QN ........  *BO A...
*T 31  *C -  *I --H-  *BI ----  *QP -LLLLLLL  *QN O.......  *BO ....
*T FC  *C -  *I ----  *BI ----  *QP --------                ^^^^^^^^
*T PS  *C -  *I ---H  *BI ----  *QP --------                ^^^^
*T RB  *C .  *I 0000  *BI 0000  *QP 00000000                ^^^^
*T LB  *C .  *I 0000  *BI 0000  *QP 00000000                ^^^^
*T PA  *C -  *I ---H  *BI ----  *QP --------                        ^^^^
*T RA  *C .  *I 0000  *BI 0000  *QP 00000000                        ^^^^
*T LA  *C .  *I 0000  *BI 0000  *QP 00000000                        ^^^^
*T D3  *C -  *I ----  *BI ----  *QP --------                           ^
*T D2  *C -  *I ----  *BI ----  *QP --------                           ^
*T D1  *C -  *I -L--  *BI ----  *QP --------                           ^
*T D0  *C -  *I -L--  *BI ----  *QP --------                           ^
*T 32  *C -  *I ----  *BI ----  *QP --------  *QN --------  *BO ....
*T 50  *C -  *I ----  *BI ----  *QP --------  *QN --------  *BO ....
             3210     3210      76543210      76543210      3210
```

TABLE 4

IFL 4

Device: Signetics Part No. 82S159

```
                                         *E AA      *F/F AAAAAAAA  *POL HHHH
*T 00   *C -   *I --H-   *BI ----   *QP --------   *QN ........O   *BO ....
*T 01   *C -   *I --H-   *BI ----   *QP -------L   *QN .......O.   *BO ....
*T 02   *C -   *I --H-   *BI ----   *QP ------LL   *QN ......O..   *BO ....
*T 03   *C -   *I --H-   *BI ----   *QP -----LLL   *QN .....O...   *BO ....
*T 04   *C -   *I --H-   *BI ----   *QP ----LLLL   *QN ....O....   *BO ....
*T 05   *C -   *I --H-   *BI ----   *QP ---LLLLL   *QN ...O.....   *BO ....
*T 06   *C -   *I --H-   *BI ----   *QP --LLLLLL   *QN ..O......   *BO ....
*T 07   *C -   *I --H-   *BI ----   *QP -LLLLLLO   *QN ........   *BO ....
*T 08   *C -   *I ---L   *BI H---   *QP HHHHHHHH   *QN ........   *BO ....
*T 09   *C -   *I ---L   *BI ---H   *QP --------   *QN ........   *BO ....
*T 10   *C -   *I H---   *BI ----   *QP --------   *QN ........   *BO ..A.
*T 11   *C -   *I ---L   *BI H--H   *QP LLLLLLLL   *QN ........   *BO ....
*T 12   *C -   *I ---L   *BI -H--   *QP --------   *QN ........   *BO ....
*T 13   *C -   *I ---L   *BI ----   *QP ------L-   *QN ........   *BO ....
*T 14   *C -   *I ---L   *BI H---   *QP --------   *QN ........   *BO A...
*T 15   *C -   *I ----   *BI -H--   *QP --------   *QN ........   *BO ...A
*T 16   *C -   *I ---L   *BI H---   *QP HHHHHHHH   *QN ........   *BO .A..
*T 17   *C -   *I ---L   *BI ---H   *QP --------   *QN ........   *BO ....
*T 18   *C -   *I ---L   *BI -H--   *QP --------   *QN ........   *BO .A..
*T 19   *C 0   *I 0000   *BI 0000   *QP 00000000   *QN 00000000   *BO AAAA
*T 20   *C 0   *I 0000   *BI 0000   *QP 00000000   *QN 00000000   *BO AAAA
*T 21   *C 0   *I 0000   *BI 0000   *QP 00000000   *QN 00000000   *BO AAAA
*T 22   *C 0   *I 0000   *BI 0000   *QP 00000000   *QN 00000000   *BO AAAA
*T 23   *C 0   *I 0000   *BI 0000   *QP 00000000   *QN 00000000   *BO AAAA
*T 24   *C 0   *I 0000   *BI 0000   *QP 00000000   *QN 00000000   *BO AAAA
*T 25   *C 0   *I 0000   *BI 0000   *QP 00000000   *QN 00000000   *BO AAAA
*T 26   *C 0   *I 0000   *BI 0000   *QP 00000000   *QN 00000000   *BO AAAA
*T 27   *C 0   *I 0000   *BI 0000   *QP 00000000   *QN 00000000   *BO AAAA
*T 28   *C 0   *I 0000   *BI 0000   *QP 00000000   *QN 00000000   *BO AAAA
*T 29   *C 0   *I 0000   *BI 0000   *QP 00000000   *QN 00000000   *BO AAAA
*T 30   *C -   *I ---L   *BI ----   *QP LLLLLLLL   *QN ........   *BO A...
*T 31   *C -   *I --H-   *BI ----   *QP -LLLLLLL   *QN O.......   *BO ....
*T FC   *C -   *I ----   *BI ----   *QP --------   ^^^^^^^^
*T PB   *C -   *I ---H   *BI ----   *QP --------   ^^^^
*T RB   *C .   *I 0000   *BI 0000   *QP 00000000   ^^^^
*T LB   *C .   *I 0000   *BI 0000   *QP 00000000   ^^^^
*T PA   *C -   *I ---H   *BI ----   *QP --------                  ^^^^
*T RA   *C .   *I 0000   *BI 0000   *QP 00000000                  ^^^^
*T LA   *C .   *I 0000   *BI 0000   *QP 00000000                  ^^^^
*T D3   *C -   *I ----   *BI ----   *QP --------                             ^
*T D2   *C -   *I ----   *BI ----   *QP --------                             ^
*T D1   *C -   *I -L--   *BI ----   *QP --------                             ^
*T D0   *C -   *I -L--   *BI ----   *QP --------                             ^
*T 32   *C -   *I ----   *BI ----   *QP --------   *QN --------   *BO ....
*T 50   *C -   *I ----   *BI ----   *QP --------   *QN --------   *BO ....
               3210       3210       76543210       76543210       3210
```

TABLE 5

IFL 5

Device: Signetics Part No. 82S153

```
                                         *POL HHHHHHHHHH
*P 00   *I -H-----H   *BI -L--------   *BO .........A
```

```
*P 01   *I -H-----H-   *BI -L---------   *BO ........A.
*P 02   *I -H---H--    *BI -L---------   *BO ........A..
*P 03   *I -H--H---    *BI -L---------   *BO .......A...
*P 04   *I -H--LLLL    *BI -H---------   *BO .........A
*P 05   *I L----LLLH   *BI -HL--------   *BO .........A.
*P 06   *I HL--LLLH    *BI -H---------   *BO ........AAA.
*P 07   *I HH--LLLH    *BI -H---------   *BO .......AAA
*P 08   *I L---LLLH    *BI -HH--------   *BO ..........A
*P 09   *I ----LLHL    *BI -H---------   *BO .........AA
*P 10   *I ---LLLHH    *BI -H---------   *BO ........A..
*P 11   *I ---HLLHH    *BI -H---------   *BO .......A.A
*P 12   *I ---LLHLL    *BI -H---------   *BO .......A..
*P 13   *I ---HLHLL    *BI -H---------   *BO .......A.A
*P 14   *I ---LLHLH    *BI -H---------   *BO ........AA.
*P 15   *I ---HLHLH    *BI -H---------   *BO .......AAA
*P 16   *I ---LLHHL    *BI -H---------   *BO .......AA.
*P 17   *I ---HLHHL    *BI -H---------   *BO .......AAA
*P 18   *I --H-LHHH    *BI -H---------   *BO .......A...
*P 19   *I --L-LHHH    *BI -H---------   *BO .......A..
*P 20   *I ----HLLL    *BI -H---------   *BO ......A.AA
*P 21   *I ----HLLH    *BI -H---------   *BO ......A..A
*P 22   *I ----HLHL    *BI -H---------   *BO ......A.A.
*P 23   *I ----HLHH    *BI -H---------   *BO .........A
*P 24   *I ----HHLL    *BI -H---------   *BO .......AA..
*P 25   *I ----HHLH    *BI -H---------   *BO ......AA.A
*P 26   *I ----HHHL    *BI -H---------   *BO .........A
*P 27   *I ----HHHH    *BI HH---------   *BO ......AAAA
*P 28   *I 00000000    *BI 0000000000   *BO AAAAAAAAAA
*P 29   *I 00000000    *BI 0000000000   *BO AAAAAAAAAA
*P 30   *I 00000000    *BI 0000000000   *BO AAAAAAAAAA
*P 31   *I 00000000    *BI 0000000000   *BO AAAAAAAAAA
*P 32   *I 00000000    *BI 0000000000        ^
*P 33   *I 00000000    *BI 0000000000        ^
*P 34   *I 00000000    *BI 0000000000        ^
*P 35   *I 00000000    *BI 0000000000        ^
*P 36   *I 00000000    *BI 0000000000        ^
*P 37   *I 00000000    *BI 0000000000        ^
*P 38   *I --------    *BI ----------        ^
*P 39   *I --------    *BI ----------        ^
*P 40   *I --------    *BI ----------        ^
*P 41   *I --------    *BI ----------        ^
         76543210         9876543210     9876543210
```

TABLE 6
-------
IFL 6

Device: Signetics Part No. 82S159

```
                                    *E ..      *F/F AAAAAAAA  *POL LLLL
*T 00  *C -  *I ----  *BI LH--  *QP --------   *QN ....AA..   *BO AAAA
*T 01  *C -  *I ----  *BI LL--  *QP --------   *QN ...AAA..   *BO AAAA
*T 02  *C -  *I LLLL  *BI H---  *QP --------   *QN ..AAAAAA   *BO AAAA
*T 03  *C -  *I LLLH  *BI H---  *QP --------   *QN ..AAAAAA   *BO AAAA
*T 04  *C -  *I LLHL  *BI H---  *QP --------   *QN ..AAAAAA   *BO AAAA
*T 05  *C -  *I LLHH  *BI H---  *QP --------   *QN ..AAAAAA   *BO AAAA
*T 06  *C -  *I LHLL  *BI H---  *QP --------   *QN .AAAA.A.   *BO AAAA
*T 07  *C -  *I LHLH  *BI H---  *QP --------   *QN ..AAA.A.   *BO AAAA
*T 08  *C -  *I LHHL  *BI H---  *QP --------   *QN A.AA.AA.   *BO AAAA
*T 09  *C -  *I LHHL  *BI H---  *QP --------   *QN ..AA.AA.   *BO AAAA
```

```
*T 09   *C -   *I LHHH   *BI H---   *QP --------   *QN ..AAAAAA   *BO AAAA
*T 10   *C -   *I HLLL   *BI H---   *QP --------   *QN ..A.AA..   *BO AAAA
*T 11   *C -   *I HLLH   *BI H---   *QP --------   *QN .AA.AA..   *BO AAAA
*T 12   *C -   *I HLHL   *BI H---   *QP --------   *QN A.A.AA..   *BO AAAA
*T 13   *C -   *I HLHH   *BI H---   *QP --------   *QN ..A.AA..   *BO AAAA
*T 14   *C -   *I HHLL   *BI H---   *QP --------   *QN .AA.AA..   *BO AAAA
*T 15   *C -   *I HHLH   *BI H---   *QP --------   *QN A.A.AA..   *BO AAAA
*T 16   *C -   *I HHHL   *BI H---   *QP --------   *QN ..AAAAA.   *BO AAAA
*T 17   *C -   *I HHHH   *BI H---   *QP --------   *QN ....AA..   *BO AAAA
*T 18   *C 0   *I 0000   *BI 0000   *QP 00000000   *QN 00000000   *BO AAAA
*T 19   *C 0   *I 0000   *BI 0000   *QP 00000000   *QN 00000000   *BO AAAA
*T 20   *C 0   *I 0000   *BI 0000   *QP 00000000   *QN 00000000   *BO AAAA
*T 21   *C 0   *I 0000   *BI 0000   *QP 00000000   *QN 00000000   *BO AAAA
*T 22   *C 0   *I 0000   *BI 0000   *QP 00000000   *QN 00000000   *BO AAAA
*T 23   *C 0   *I 0000   *BI 0000   *QP 00000000   *QN 00000000   *BO AAAA
*T 24   *C 0   *I 0000   *BI 0000   *QP 00000000   *QN 00000000   *BO AAAA
*T 25   *C 0   *I 0000   *BI 0000   *QP 00000000   *QN 00000000   *BO AAAA
*T 26   *C 0   *I 0000   *BI 0000   *QP 00000000   *QN 00000000   *BO AAAA
*T 27   *C 0   *I 0000   *BI 0000   *QP 00000000   *QN 00000000   *BO AAAA
*T 28   *C 0   *I 0000   *BI 0000   *QP 00000000   *QN 00000000   *BO AAAA
*T 29   *C 0   *I 0000   *BI 0000   *QP 00000000   *QN 00000000   *BO AAAA
*T 30   *C 0   *I 0000   *BI 0000   *QP 00000000   *QN 00000000   *BO AAAA
*T 31   *C 0   *I 0000   *BI 0000   *QP 00000000   *QN 00000000   *BO AAAA
*T FC   *C 0   *I 0000   *BI 0000   *QP 00000000
*T FB   *C .   *I 0000   *BI 0000   *QP 00000000
*T RB   *C .   *I 0000   *BI 0000   *QP 00000000
*T LB   *C .   *I 0000   *BI 0000   *QP 00000000
*T FA   *C .   *I 0000   *BI 0000   *QP 00000000
*T RA   *C .   *I 0000   *BI 0000   *QP 00000000
*T LA   *C .   *I 0000   *BI 0000   *QP 00000000
*T D3   *C .   *I 0000   *BI 0000   *QP 00000000                            ^
*T D2   *C .   *I 0000   *BI 0000   *QP 00000000                            ^
*T D1   *C .   *I 0000   *BI 0000   *QP 00000000                            ^
*T D0   *C .   *I 0000   *BI 0000   *QP 00000000                            ^
*T 32   *C -   *I LLLL   *BI LLLL   *QP HHHHHHHH   *QN --------   *BO ....
*T 50   *C -   *I HHHH   *BI HHHH   *QP LLLLLLLL   *QN --------   *BO ....
                         3210       3210          76543210        76543210     3210
```

TABLE 7

IFL 7

Device: Signetics Part No. 82S159

```
                                      *E ..      *F/F AAAAAAAA   *POL LLLL
*T 00   *C -   *I -------*BI L---   *QP --------   *QN A..A....   *BO ....
*T 01   *C -   *I LLLL   *BI H---   *QP --------   *QN ...A....   *BO ....0
*T 02   *C -   *I LLLH   *BI H---   *QP --------   *QN ...A....   *BO ....1
*T 03   *C -   *I LLHL   *BI H---   *QP --------   *QN ........   *BO ....2
*T 04   *C -   *I LLHH   *BI H---   *QP --------   *QN ...A....   *BO ....3
*T 05   *C -   *I LHLL   *BI H---   *QP --------   *QN ...A..A.   *BO ....4
*T 06   *C -   *I LHLH   *BI H---   *QP --------   *QN ...A....   *BO ....5
*T 07   *C -   *I LHHL   *BI H---   *QP --------   *QN ...AA...   *BO ....6
*T 08   *C -   *I LHHH   *BI H---   *QP --------   *QN ........   *BO ....
*T 09   *C -   *I HLLL   *BI H---   *QP --------   *QN ...A.AA.   *BO ....8
*T 10   *C -   *I HLLH   *BI H---   *QP --------   *QN ...A.A..   *BO ....9
*T 11   *C -   *I HLHL   *BI H---   *QP --------   *QN ...A.A..   *BO ....10
*T 12   *C -   *I HLHH   *BI H---   *QP --------   *QN ...AA..A   *BO ....11
*T 13   *C -   *I HHLL   *BI H---   *QP --------   *QN ...A...A   *BO ....12
*T 14   *C -   *I HHLH   *BI H---   *QP --------   *QN ...A...A   *BO ....13
*T 15   *C -   *I HHHL   *BI H---   *QP --------   *QN ........   *BO ....
*T 16   *C -   *I HHHH   *BI H---   *QP --------   *QN .AAA....   *BO ....15
```

| | | | | | | |
|---|---|---|---|---|---|---|
| *T 17 | *C - | *I LHHH | *BI H--- | *QP -------- | *QN ...A.AA. | *BO ....7· |
| *T 18 | *C - | *I HHHL | *BI H--- | *QP -------- | *QN ..AA.... | *BO ....I·· |
| *T 19 | *C O | *I 0000 | *BI 0000 | *QP 00000000 | *QN 00000000 | *BO AAAA |
| *T 20 | *C O | *I 0000 | *BI 0000 | *QP 00000000 | *QN 00000000 | *BO AAAA |
| *T 21 | *C O | *I 0000 | *BI 0000 | *QP 00000000 | *QN 00000000 | *BO AAAA |
| *T 22 | *C O | *I 0000 | *BI 0000 | *QP 00000000 | *QN 00000000 | *BO AAAA |
| *T 23 | *C O | *I 0000 | *BI 0000 | *QP 00000000 | *QN 00000000 | *BO AAAA |
| *T 24 | *C O | *I 0000 | *BI 0000 | *QP 00000000 | *QN 00000000 | *BO AAAA |
| *T 25 | *C O | *I 0000 | *BI 0000 | *QP 00000000 | *QN 00000000 | *BO AAAA |
| *T 26 | *C O | *I 0000 | *BI 0000 | *QP 00000000 | *QN 00000000 | *BO AAAA |
| *T 27 | *C O | *I 0000 | *BI 0000 | *QP 00000000 | *QN 00000000 | *BO AAAA |
| *T 28 | *C O | *I 0000 | *BI 0000 | *QP 00000000 | *QN 00000000 | *BO AAAA |
| *T 29 | *C O | *I 0000 | *BI 0000 | *QP 00000000 | *QN 00000000 | *BO AAAA |
| *T 30 | *C O | *I 0000 | *BI 0000 | *QP 00000000 | *QN 00000000 | *BO AAAA |
| *T 31 | *C O | *I 0000 | *BI 0000 | *QP 00000000 | *QN 00000000 | *BO AAAA |
| *T FC | *C O | *I 0000 | *BI 0000 | *QP 00000000 | ^^^^^^^^ | |
| *T PB | *C . | *I 0000 | *BI 0000 | *QP 00000000 | ^^^^ | |
| *T RB | *C . | *I 0000 | *BI 0000 | *QP 00000000 | ^^^^ | |
| *T LB | *C . | *I 0000 | *BI 0000 | *QP 00000000 | ^^^^ | |
| *T PA | *C . | *I 0000 | *BI 0000 | *QP 00000000 | ^^^^ | |
| *T RA | *C . | *I 0000 | *BI 0000 | *QP 00000000 | ^^^^ | |
| *T LA | *C . | *I 0000 | *BI 0000 | *QP 00000000 | ^^^^ | |
| *T D3 | *C . | *I 0000 | *BI 0000 | *QP 00000000 | | ^ |
| *T D2 | *C . | *I 0000 | *BI 0000 | *QP 00000000 | | ^ |
| *T D1 | *C . | *I 0000 | *BI 0000 | *QP 00000000 | | ^ |
| *T D0 | *C . | *I 0000 | *BI 0000 | *QP 00000000 | | ^ |
| *T 32 | *C - | *I LLLL | *BI LLLL | *QP HHHHHHHH | *QN -------- | *BO .... |
| *T 50 | *C - | *I HHHH | *BI HHHH | *QP LLLLLLLL | *QN -------- | *BO .... |
| | | 3210 | 3210 | 76543210 | 76543210 | 3210 |

TABLE 8

IFL 8

Device: Signetics Part No. 82S159

| | | | | | *E AA | *F/F ........ | *PUL LLLL |
|---|---|---|---|---|---|---|---|
| *T 00 | *C - | *I H--- | *BI ---- | *QP -------- | *QN ........O | *BO .... | |
| *T 01 | *C - | *I H--- | *BI ---- | *QP -------L | *QN .......O. | *BO .... | |
| *T 02 | *C - | *I H--- | *BI ---- | *QP ------LL | *QN ......O.. | *BO .... | |
| *T 03 | *C - | *I H--- | *BI ---- | *QP -----LLL | *QN .....O... | *BO .... | |
| *T 04 | *C - | *I H--- | *BI ---- | *QP ----LLLL | *QN ...O.... | *BO .... | |
| *T 05 | *C - | *I H--- | *BI ---- | *QP ---LLLLL | *QN ..O..... | *BO .... | |
| *T 06 | *C - | *I H--- | *BI ---- | *QP --LLLLLL | *QN .O...... | *BO .... | |
| *T 07 | *C - | *I --H- | *BI ---- | *QP -------- | *QN ........ | *BO A... | |
| *T 08 | *C O | *I 0000 | *BI 0000 | *QP 00000000 | *QN 00000000 | *BO AAAA | |
| *T 09 | *C O | *I 0000 | *BI 0000 | *QP 00000000 | *QN 00000000 | *BO AAAA | |
| *T 10 | *C O | *I 0000 | *BI 0000 | *QP 00000000 | *QN 00000000 | *BO AAAA | |
| *T 11 | *C O | *I 0000 | *BI 0000 | *QP 00000000 | *QN 00000000 | *BO AAAA | |
| *T 12 | *C O | *I 0000 | *BI 0000 | *QP 00000000 | *QN 00000000 | *BO AAAA | |
| *T 13 | *C O | *I 0000 | *BI 0000 | *QP 00000000 | *QN 00000000 | *BO AAAA | |
| *T 14 | *C O | *I 0000 | *BI 0000 | *QP 00000000 | *QN 00000000 | *BO AAAA | |
| *T 15 | *C O | *I 0000 | *BI 0000 | *QP 00000000 | *QN 00000000 | *BO AAAA | |
| *T 16 | *C O | *I 0000 | *BI 0000 | *QP 00000000 | *QN 00000000 | *BO AAAA | |
| *T 17 | *C O | *I 0000 | *BI 0000 | *QP 00000000 | *QN 00000000 | *BO AAAA | |
| *T 18 | *C O | *I 0000 | *BI 0000 | *QP 00000000 | *QN 00000000 | *BO AAAA | |
| *T 19 | *C O | *I 0000 | *BI 0000 | *QP 00000000 | *QN 00000000 | *BO AAAA | |
| *T 20 | *C O | *I 0000 | *BI 0000 | *QP 00000000 | *QN 00000000 | *BO AAAA | |
| *T 21 | *C O | *I 0000 | *BI 0000 | *QP 00000000 | *QN 00000000 | *BO AAAA | |
| *T 22 | *C O | *I 0000 | *BI 0000 | *QP 00000000 | *QN 00000000 | *BO AAAA | |
| *T 23 | *C O | *I 0000 | *BI 0000 | *QP 00000000 | *QN 00000000 | *BO AAAA | |
| *T 24 | *C O | *I 0000 | *BI 0000 | *QP 00000000 | *QN 00000000 | *BO AAAA | |

```
*T 25   *C O   *I 0000   *BI 0000   *QP 00000000   *QN 00000000   *BO AAAA
*T 26   *C O   *I 0000   *BI 0000   *QP 00000000   *QN 00000000   *BO AAAA
*T 27   *C O   *I 0000   *BI 0000   *QP 00000000   *QN 00000000   *BO AAAA
*T 28   *C O   *I 0000   *BI 0000   *QP 00000000   *QN 00000000   *BO AAAA
*T 29   *C O   *I 0000   *BI 0000   *QP 00000000   *QN 00000000   *BO AAAA
*T 30   *C O   *I 0000   *BI 0000   *QP 00000000   *QN 00000000   *BO AAAA
*T 31   *C O   *I 0000   *BI 0000   *QP 00000000   *QN 00000000   *BO AAAA
*T FC   *C O   *I 0000   *BI 0000   *QP 00000000       ^^^^^^^^
*T PB   *C -   *I ---H   *BI ----   *QP --------       ^^^^
*T RB   *C .   *I 0000   *BI 0000   *QP 00000000       ^^^^
*T LB   *C .   *I 0000   *BI 0000   *QP 00000000       ^^^^
*T PA   *C -   *I ---H   *BI ----   *QP --------                    ^^^^
*T RA   *C .   *I 0000   *BI 0000   *QP 00000000                    ^^^^
*T LA   *C .   *I 0000   *BI 0000   *QP 00000000                    ^^^^
*T D3   *C -   *I -L--   *BI ----   *QP --------                                  ^
*T D2   *C .   *I 0000   *BI 0000   *QP 00000000                                  ^
*T D1   *C .   *I 0000   *BI 0000   *QP 00000000                                  ^
*T D0   *C .   *I 0000   *BI 0000   *QP 00000000                                  ^
*T 32   *C -   *I LLLL   *BI LLLL   *QP HHHHHHHH   *QN --------   *BO ....
*T 50   *C -   *I HHHH   *BI HHHH   *QP LLLLLLLL   *QN --------   *BO ....
               3210      3210       76543210       76543210       3210
```

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventor faculty. Thus, the present invention is not intended to be limited to the embodiment shown herein, but is to be accorded to the widest scope consistent with the principles and novel features disclosed herein.

What is claimed is:

1. An apparatus for identifying each pixel, in lines of bicolored pixels of a raster scanned video image of a scene containing at least one object, to the object of which the pixel corresponds, comprising:
   means for grouping adjacent bicolored pixels of the same color across a line into corresponding numbered pixel groups,
   means for downwardly grouping pixel groups of the same color into numbered blobs of pixel groups, when a next line pixel group occurs which is of the same color with more than one previous line pixel group the next line pixel group is grouped as part of the first occurring previous line blob,
   means for upwardly grouping additional pixel group matches occurring between pixel groups of previous and a next line to provide a common ancestor blob number to each blob of the pixel group in each additional pixel group match; and
   means for grouping blobs having common ancestor blob numbers into numbered objects, each blob belonging to an object so that each pixel, through a blob number, corresponds to an object number.

2. The apparatus of claim 1 further comprising means for generating a new pixel group number upon the occurrence of each differently colored pixel group.

3. The apparatus of claim 1 further comprising:
   means for generating a new blob number upon the occurrence of differently colored pixel groups when the pixel group is of a different color as a previous line pixel group directly above; and
   means for storing each blob number as an ancestor blob number.

4. The apparatus of claim 3 further comprising:
   means for reassigning an ancestor blob number a common ancestor blob number, each common ancestor number being stored as a new ancestor blob number for the blob number.

5. The apparatus of claim 1 further comprising:
   means for generating a new object number corresponding to each different common ancestor blob number; and
   means for storing each object number corresponding to each blob number.

6. The apparatus of claim 2 further comprising:
   means for generating a new blob number upon the occurrence of differently colored pixel groups when the pixel group is of a different color as a previous line pixel group directly above; and
   means for storing each blob number as an ancestor blob number.

7. The apparatus of claim 6 further comprising:
   means for reassigning an ancestor blob number a common ancestor blob number, each common ancestor blob number being stored as a new ancestor blob number for the blob number.

8. The apparatus of claim 7 further comprising:
   means for generating a new object number corresponding to each different common ancestor blob number; and
   means for storing each object number corresponding to each blob number.

9. A method for identifying each pixel, in lines of bicolored pixels of a raster scanned video image of a scene containing at least one object, to the object of which the pixel corresponds, comprising the steps of:
   grouping adjacent bicolored pixels of the same color across a line into corresponding numbered pixel groups;
   grouping, downwardly, pixel groups of the same color into numbered blobs of pixel groups, when a next line pixel group occurs which is of the same color with more than one previous line pixel group the next line pixel group is grouped as part of the first occurring previous line blob;

grouping, upwardly, additional pixel group matches occurring between pixel groups of a previous and a next line so as to provide a common ancestor blob number to each blob of the pixel group in each additional pixel group match;

grouping blobs having common ancestor blob numbers into numbered objects, each blob belonging to an object so that each pixel corresponds, through a blob number, to an object number.

10. The method of claim 1 further comprising the step of generating a new pixel group number upon the occurrence of each different colored pixel group.

11. The method of claim 1 further comprising the steps of:
generating a new blob number upon the occurrence of differently colored pixel groups when the pixel group is of a different color as a previous line pixel group directly above; and
storing generated blob numbers as an ancestor blob number.

12. The method of claim 11 further comprising the steps of:
reassigning an ancestor blob number a common ancestor blob number; and
storing said common ancestor blob number as a new ancestor blob number for the blob number.

13. The method of claim 12 further comprising the step of:
generating a new object number corresponding to each different common ancestor for number; and
storing an object number corresponding to each blob number.

14. The method of claim 10 further comprising the steps of:
generating a new blob number upon the occurrence of differently colored pixel groups when the pixel group is of a different color as a previous line pixel group directly above; and
storing generated blob numbers as an ancestor blob number.

15. The method of claim 14 further comprising the steps of:
reassigning an ancestor blob number a common ancestor blob number; and
storing said common ancestor blob number as a new ancestor blob number for the blob number.

16. The method of claim 15 further comprising the step of:
generating a new object number corresponding to each different common ancestor number; and
storing an object number corresponding to each blob number.

* * * * *

UNITED STATES PATENT AND TRADEMARK OFFICE
CERTIFICATE OF CORRECTION

PATENT NO. : 4,718,090

DATED : January 5, 1988

INVENTOR(S) : James E. Cooper, Jr.

It is certified that error appears in the above-identified patent and that said Letters Patent is hereby corrected as shown below:

Column 37, claim 10, line 10, delete "1" and insert therefor --9--;

Column 37, claim 11, line 13, delete "1" and insert therefore --9--;

Signed and Sealed this

Second Day of August, 1988

Attest:

DONALD J. QUIGG

*Attesting Officer*  *Commissioner of Patents and Trademarks*